United States Patent [19]
Mojden et al.

[11] 3,878,945
[45] Apr. 22, 1975

[54] METHOD AND APPARATUS FOR COUNTING AND PACKAGING CAN ENDS

[75] Inventors: Wallace W. Mojden, Hinsdale; Jose E. Davila, Chicago; George W. Hooper, Western Springs; Gerald M. Kwiatkowski, Dolton; Howard W. Pantel, Jr., Woodridge, all of Ill.

[73] Assignee: Fleetwood Systems, Inc., Countryside, Ill.

[22] Filed: Apr. 16, 1973

[21] Appl. No.: 351,639

[52] U.S. Cl................. 214/7; 214/8.5 D; 235/98 C
[51] Int. Cl............................................. B65g 57/00
[58] Field of Search............ 214/7, 8.5 D; 235/98 R, 235/98 C

[56] References Cited
UNITED STATES PATENTS

| | | | |
|---|---|---|---|
| 1,192,705 | 7/1916 | Taliaferro et al. | 235/98 R |
| 1,641,476 | 9/1927 | Edwards | 235/98 R X |
| 1,803,621 | 5/1931 | Jones | 214/7 X |
| 2,485,328 | 10/1949 | Spraker | 235/98 R |
| 3,156,115 | 11/1964 | Adelmann | 235/98 R X |
| 3,239,138 | 3/1966 | Loeffler | 235/98 R |
| 3,313,482 | 4/1967 | Midgley et al. | 235/98 R |
| 3,337,064 | 8/1967 | Mojden et al. | 214/7 |
| 3,497,086 | 2/1970 | Adams et al. | 214/7 |

*Primary Examiner*—Robert J. Spar
*Assistant Examiner*—Leslie J. Paperner
*Attorney, Agent, or Firm*—Olson, Trexler, Wolters, Bushnell & Fosse

[57] ABSTRACT

The present application discloses a method and apparatus for receiving a flow of can ends and automatically separating from said flow a stack having a predetermined number of can ends. The disclosure further includes apparatus for conveying the counted stack of ends to a bagging station wherein bagging can be effected either manually or automatically. In addition, the present disclosure relates to novel automatic bagging apparatus, as well as apparatus for receiving and storing the packaged ends from the bagging station.

9 Claims, 34 Drawing Figures

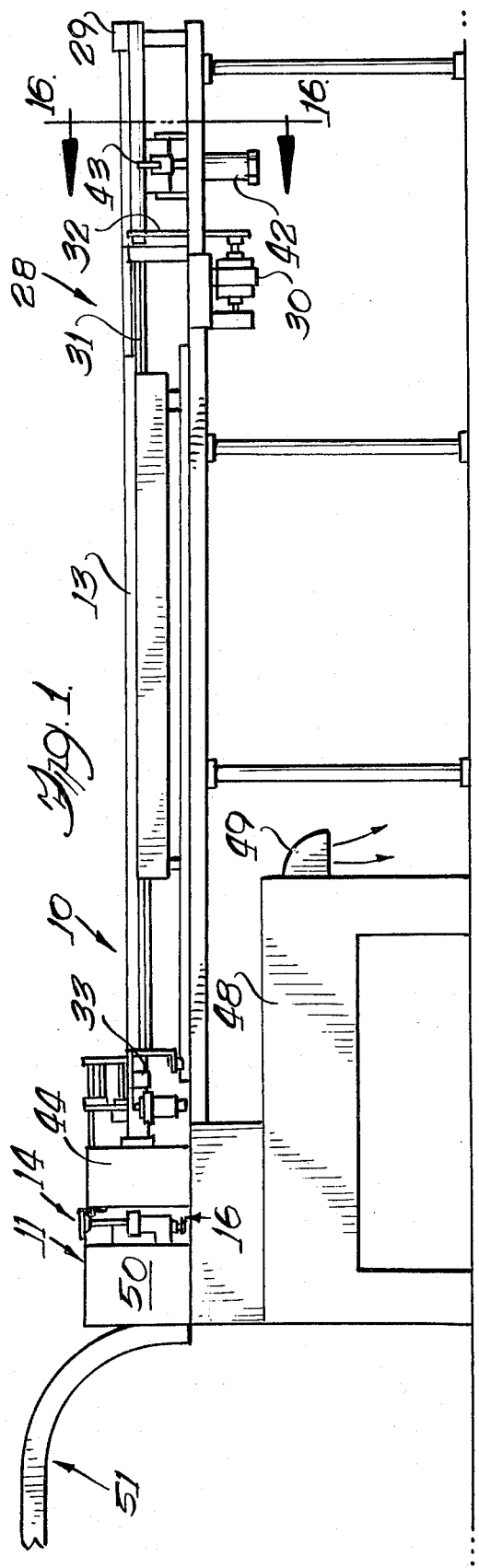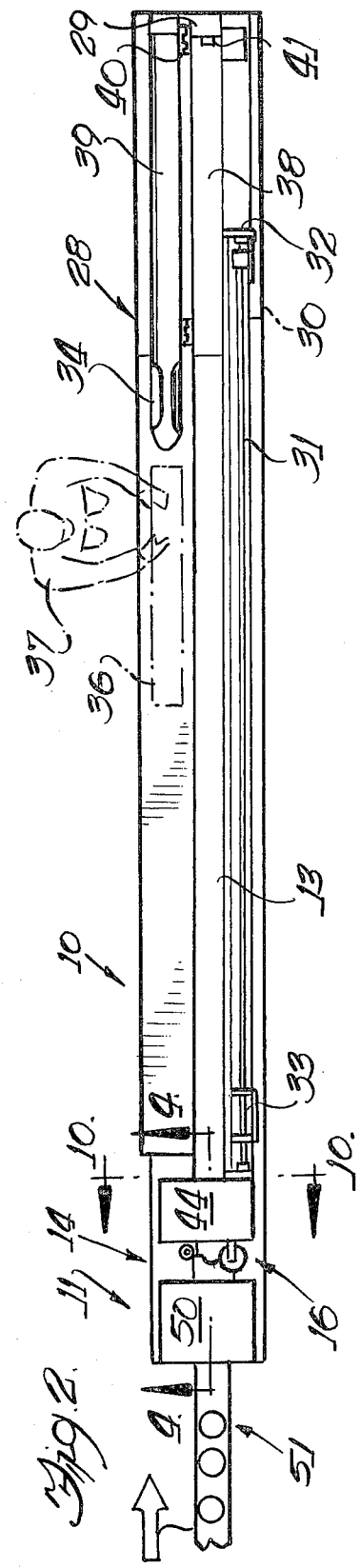

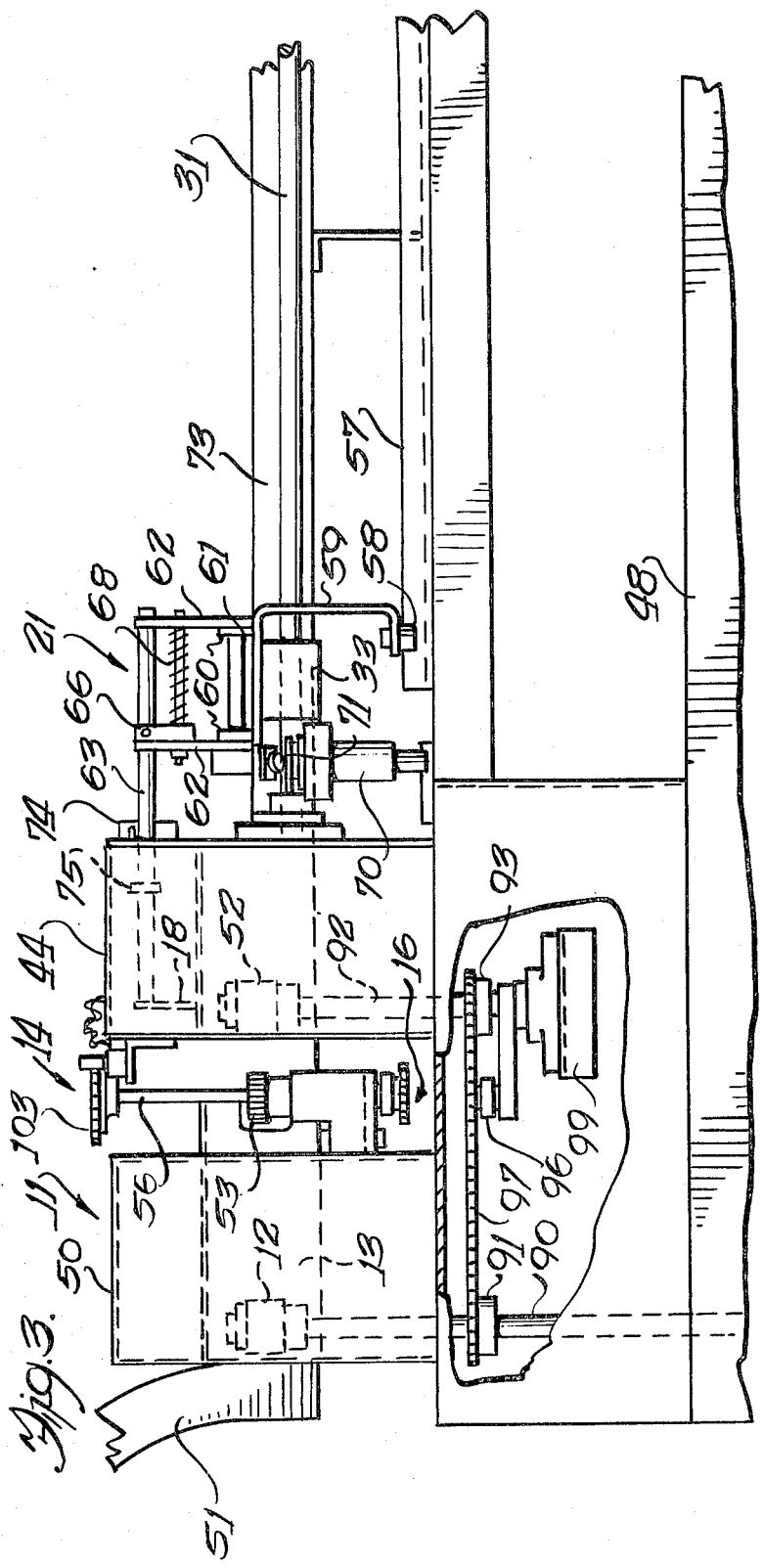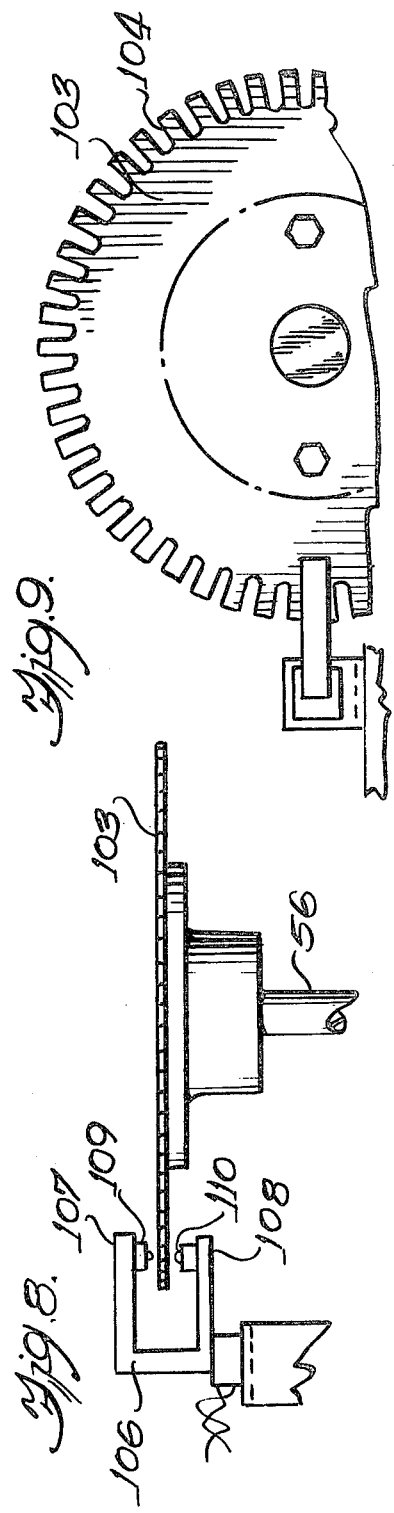

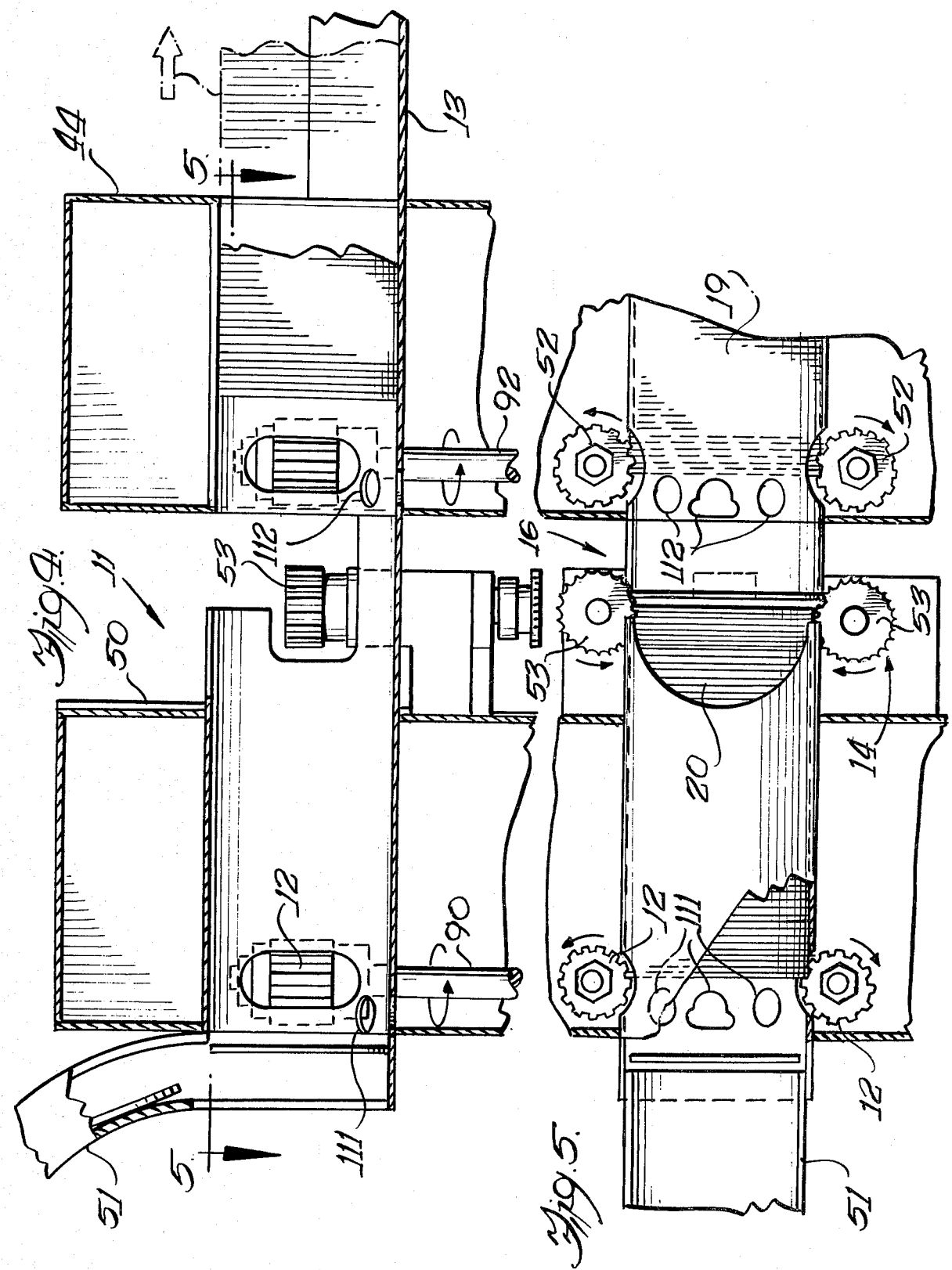

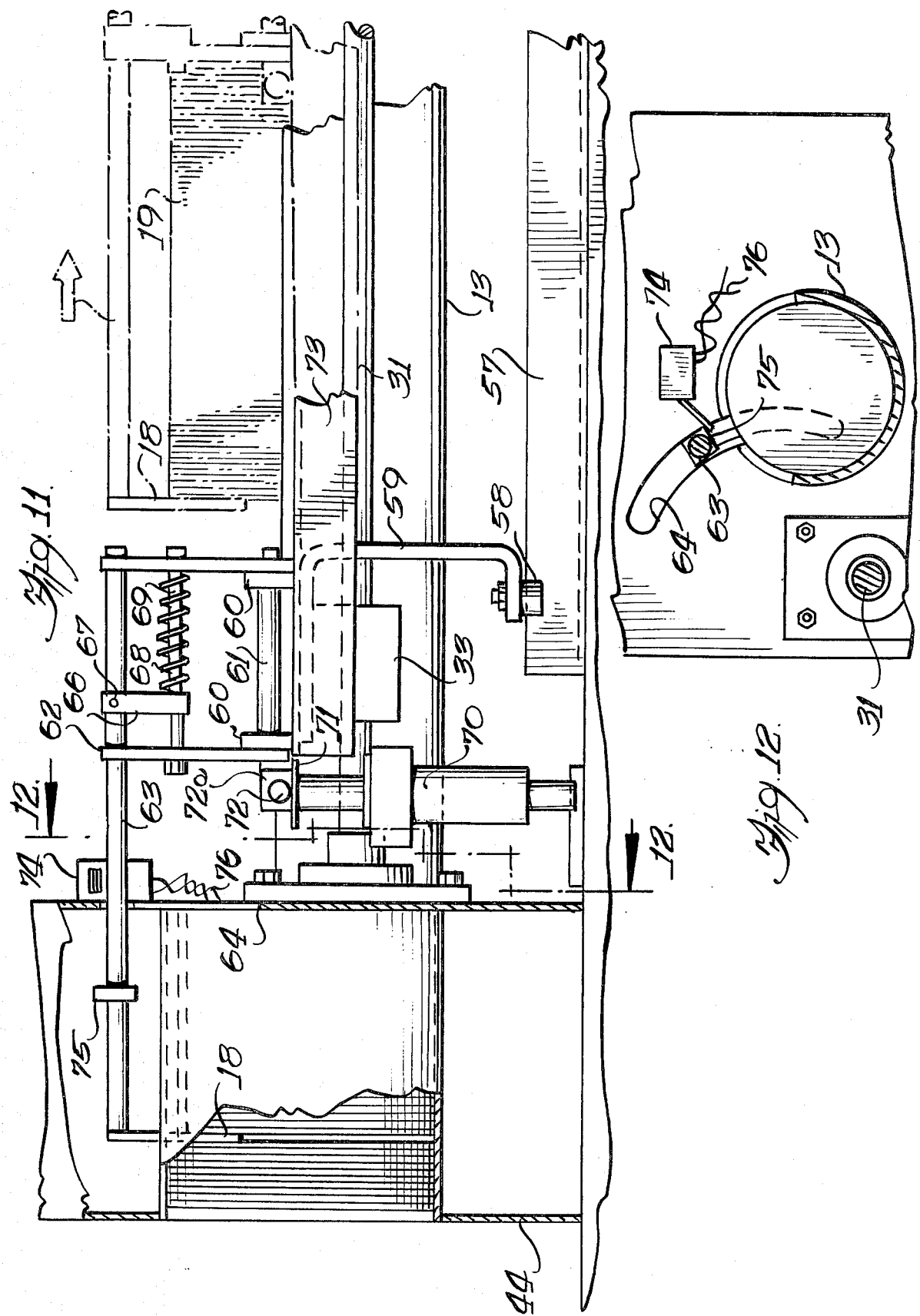

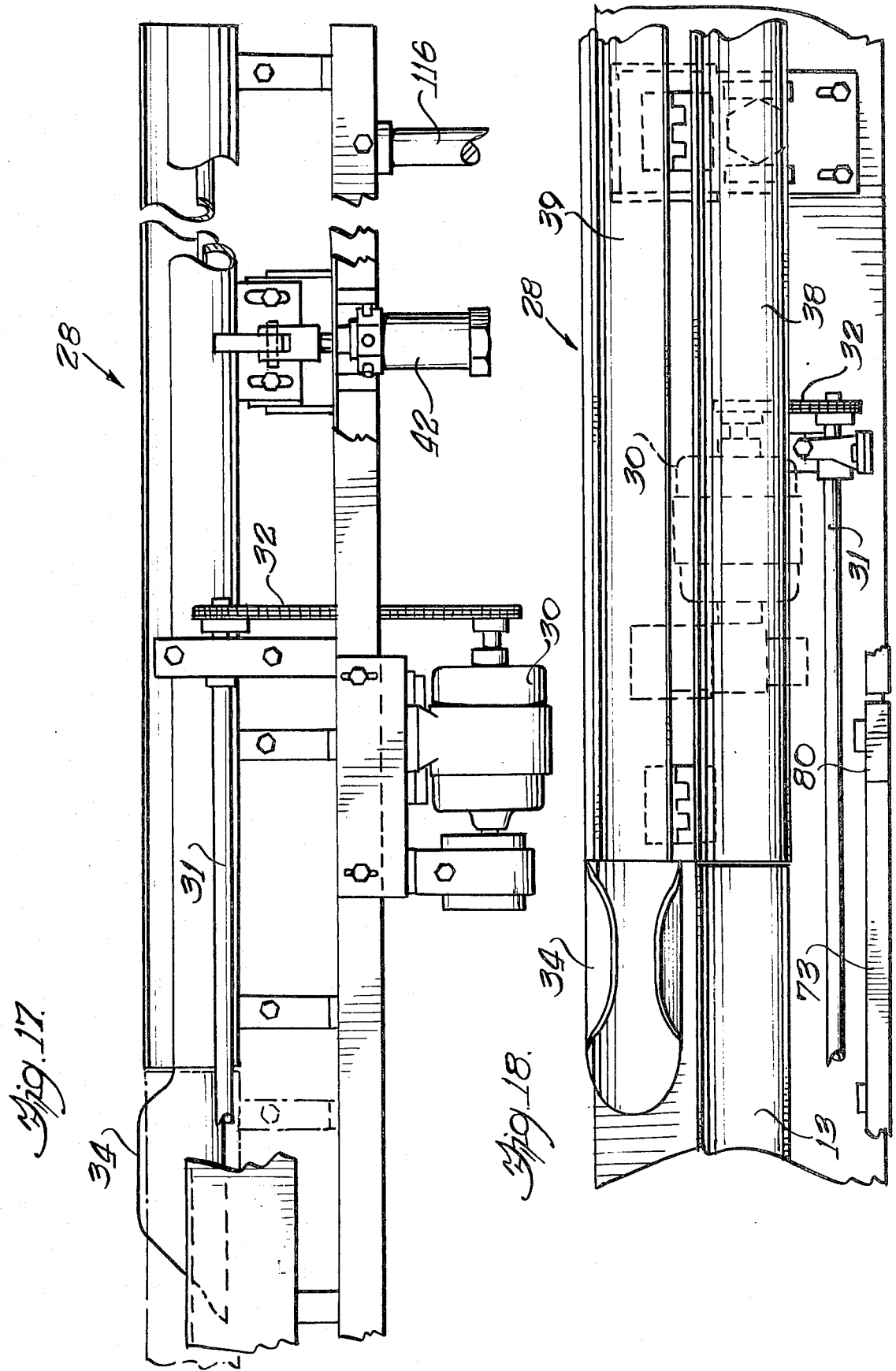

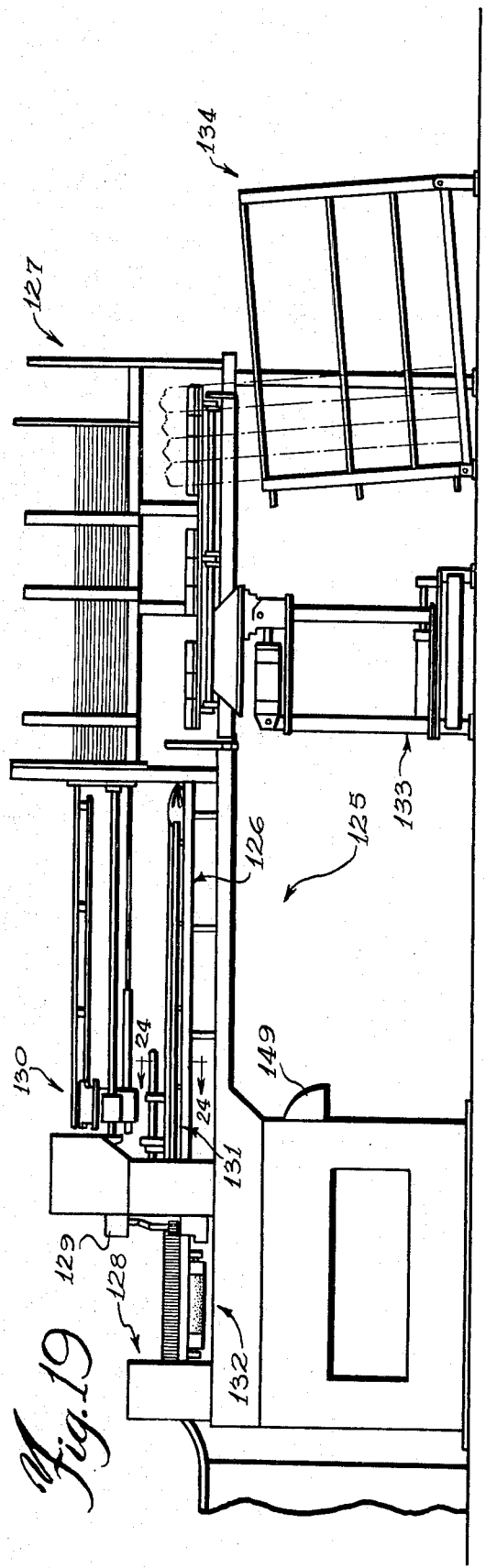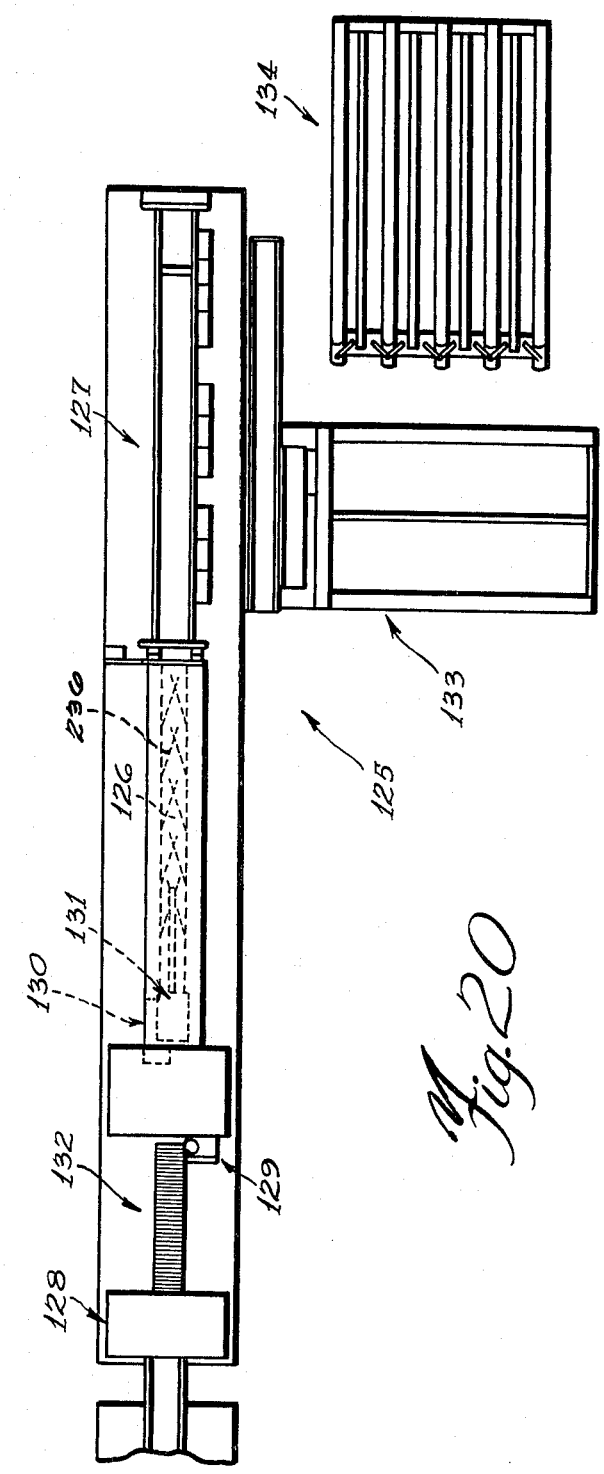

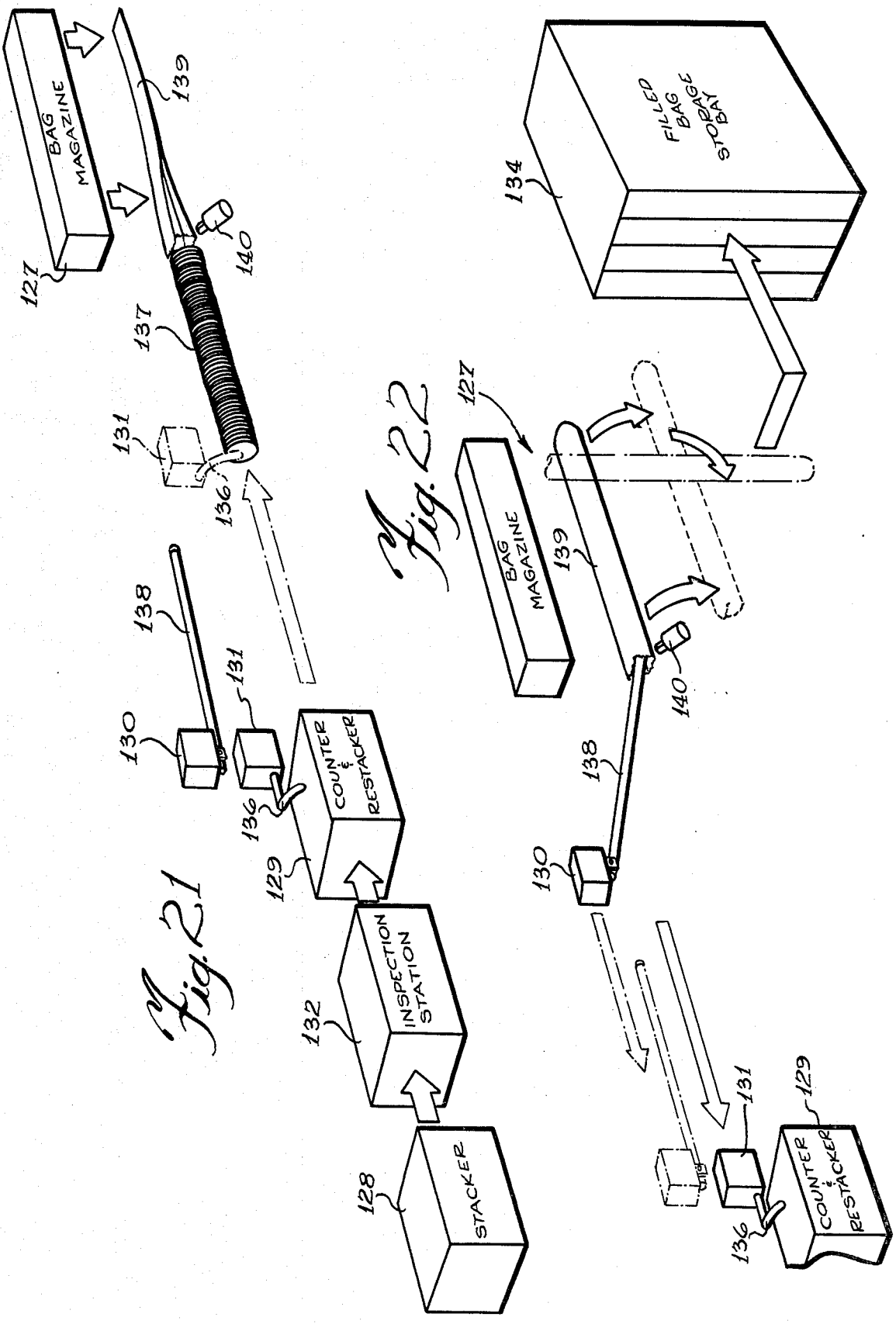

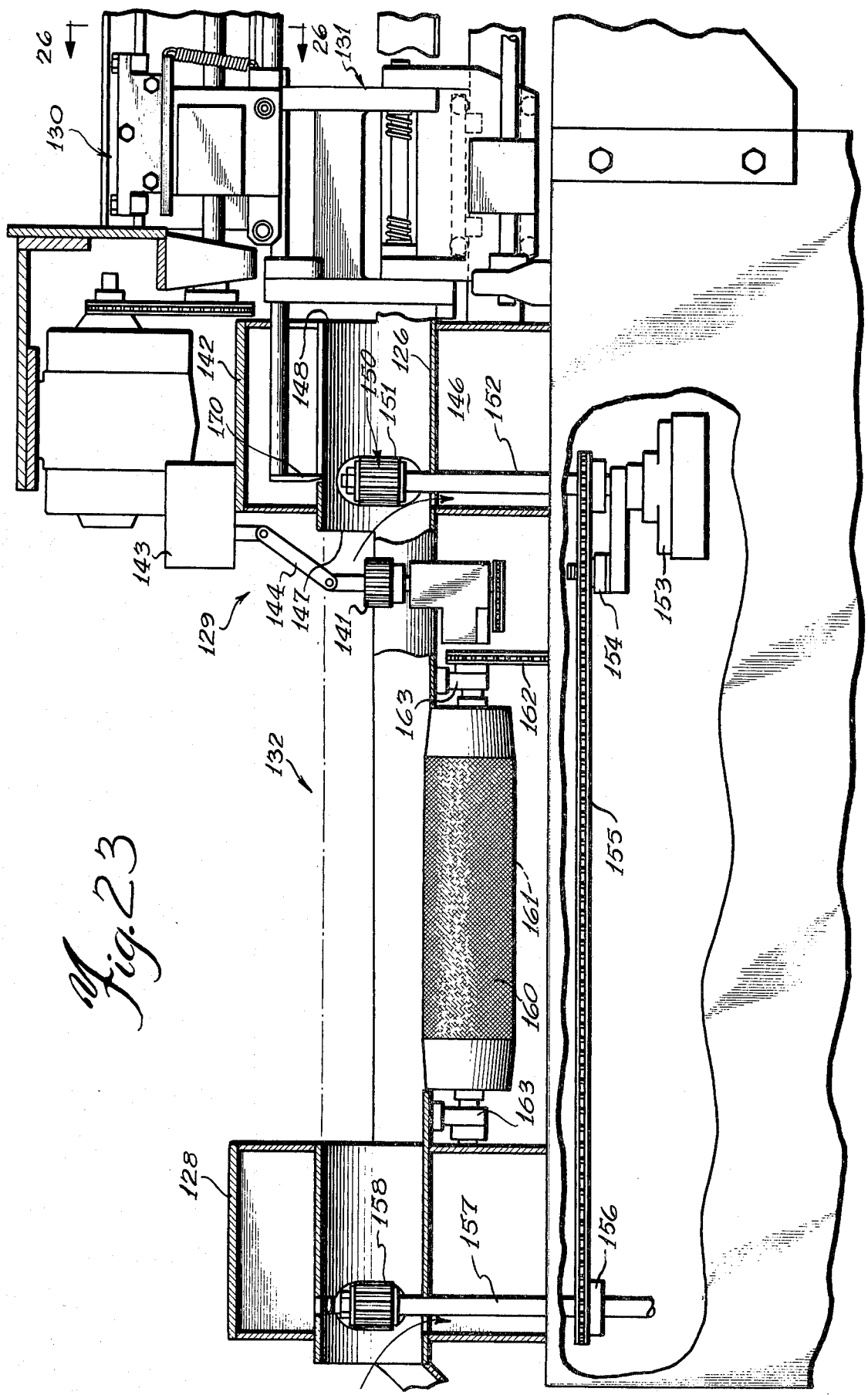

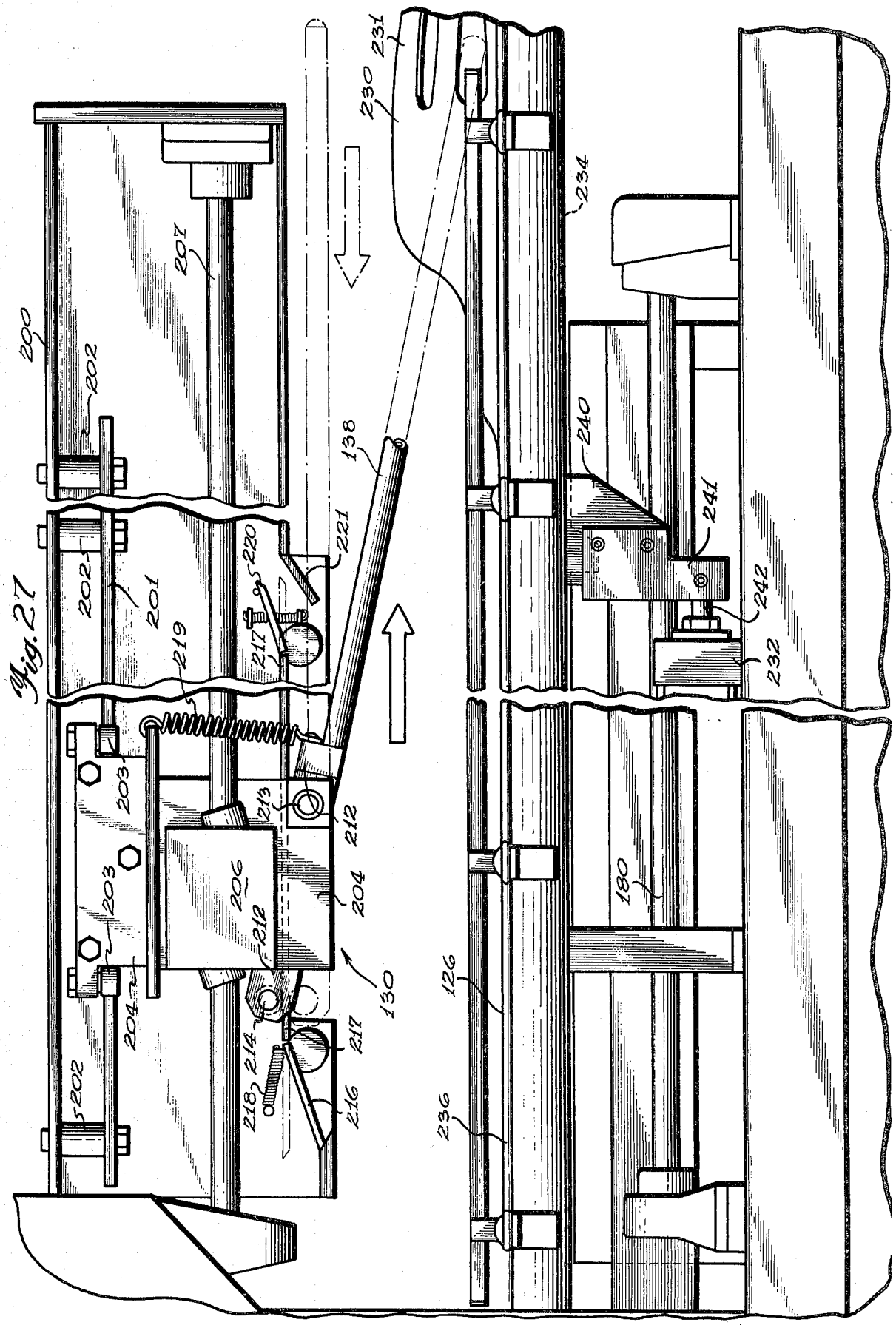

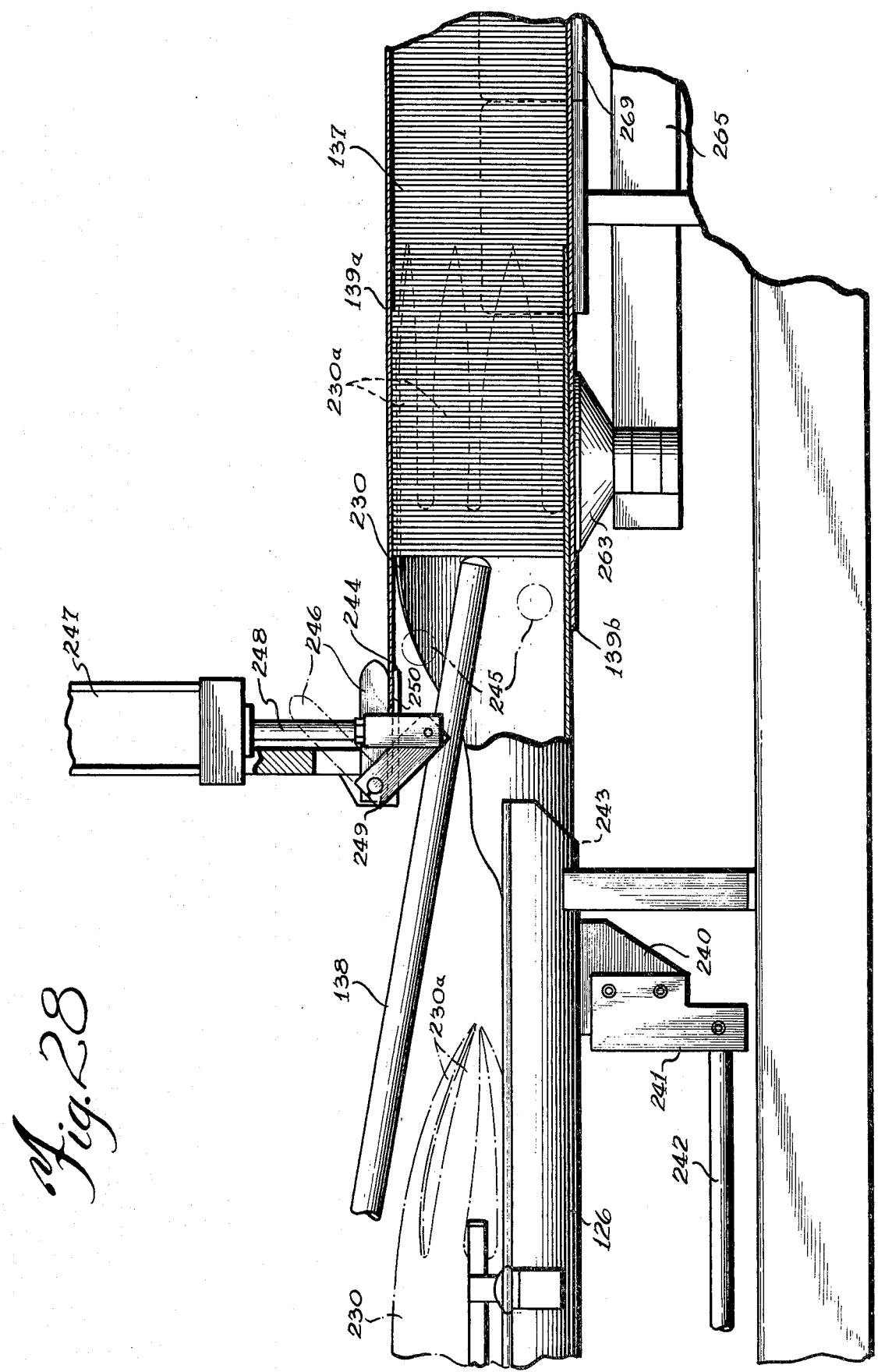

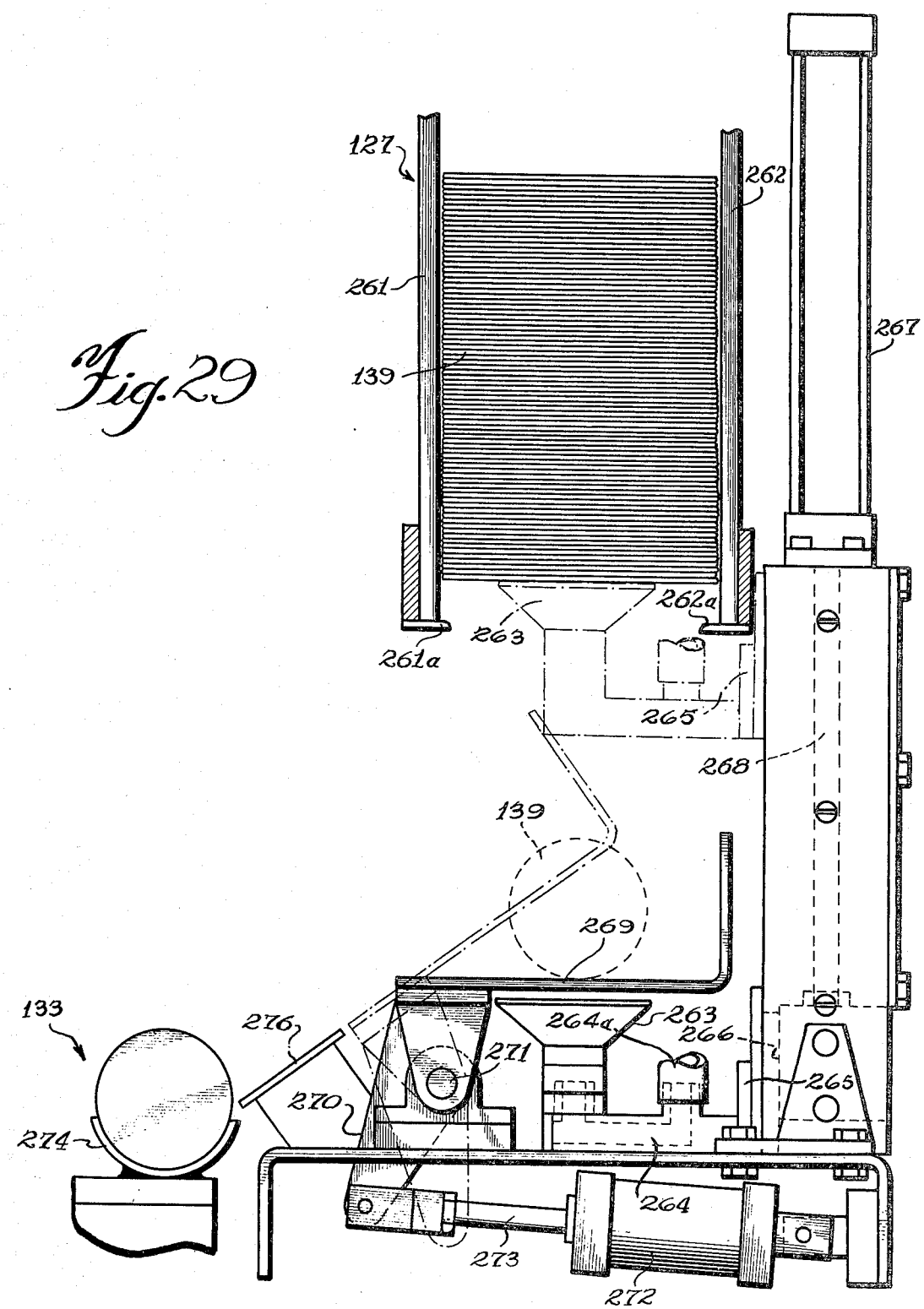

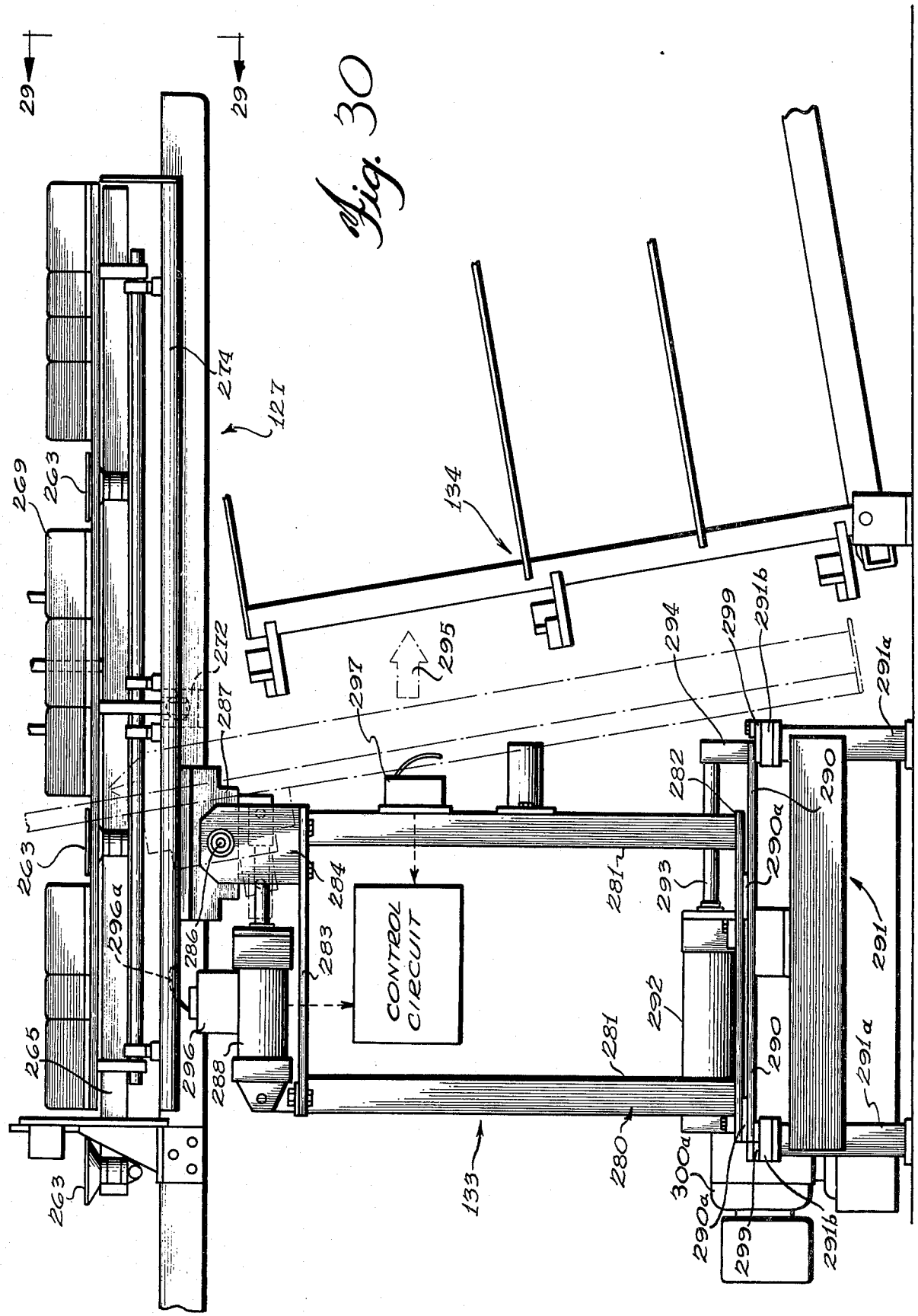

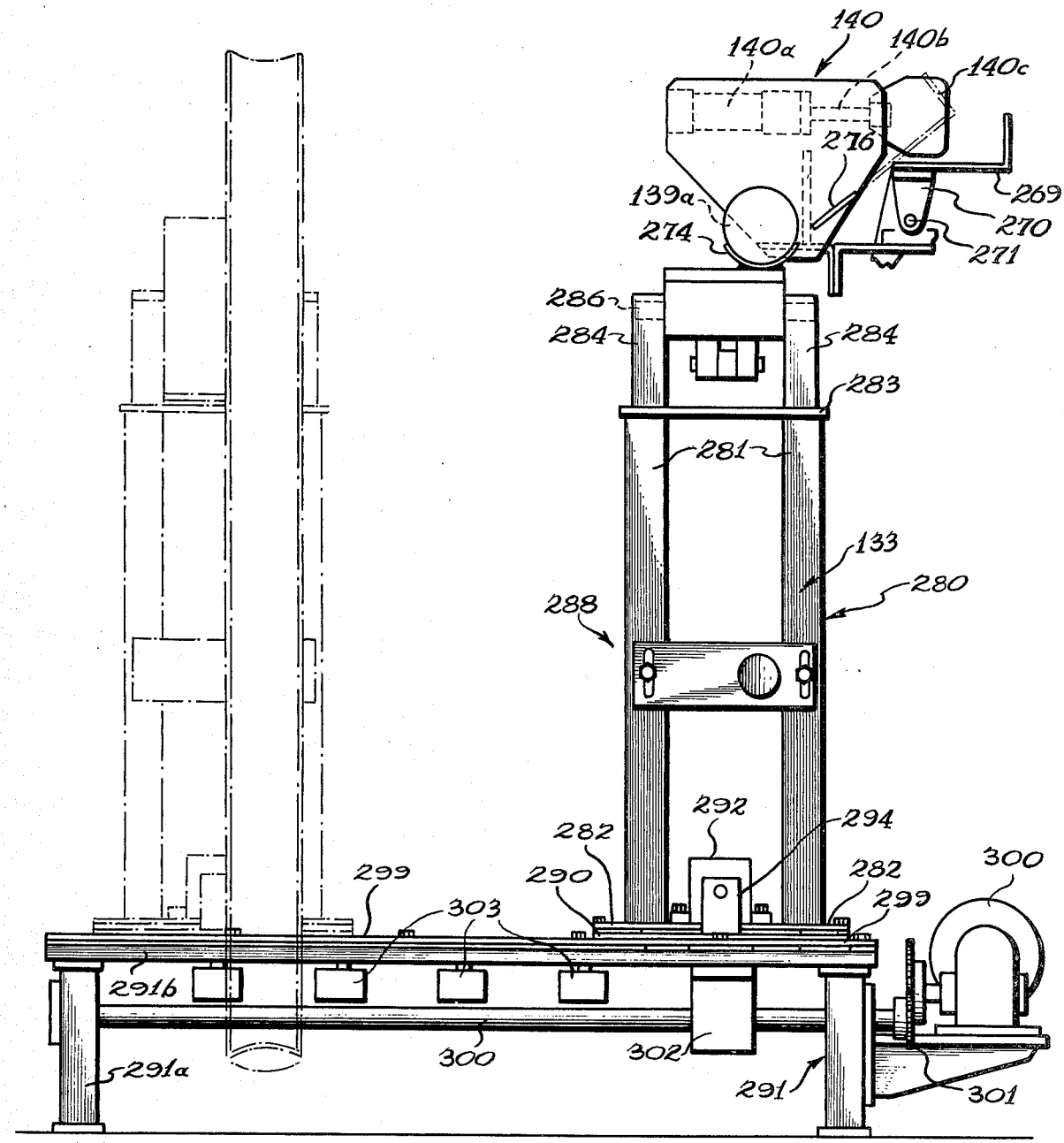

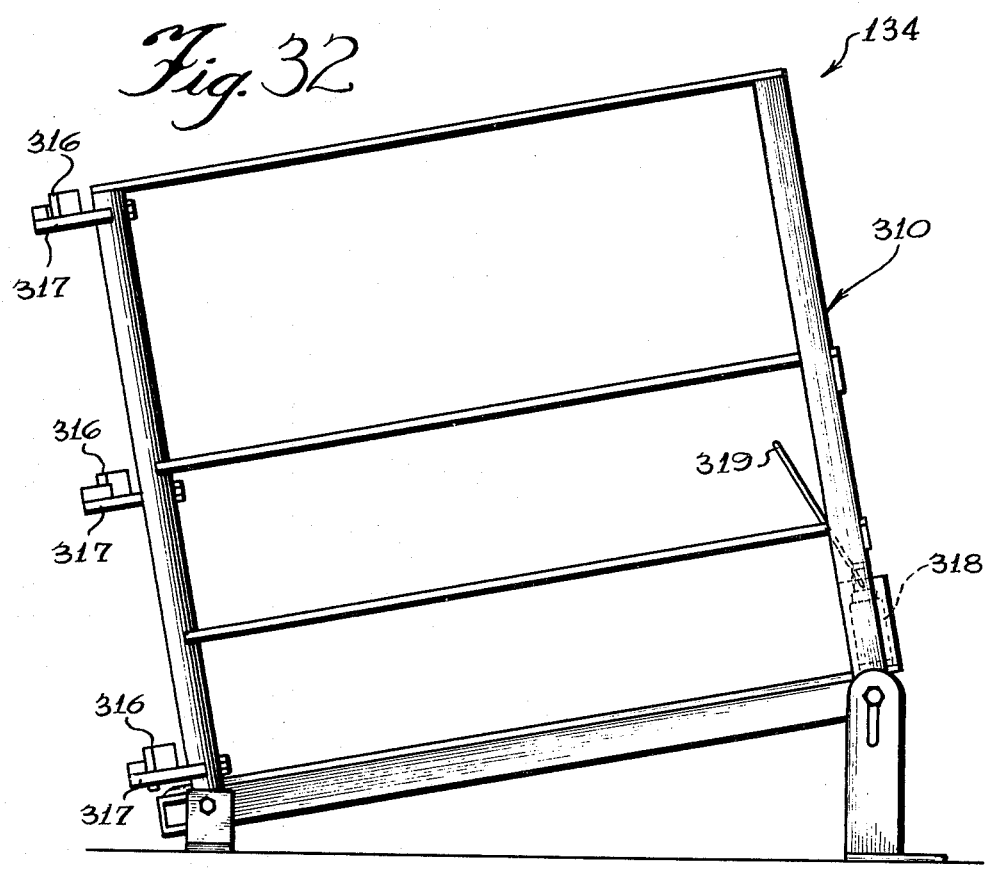
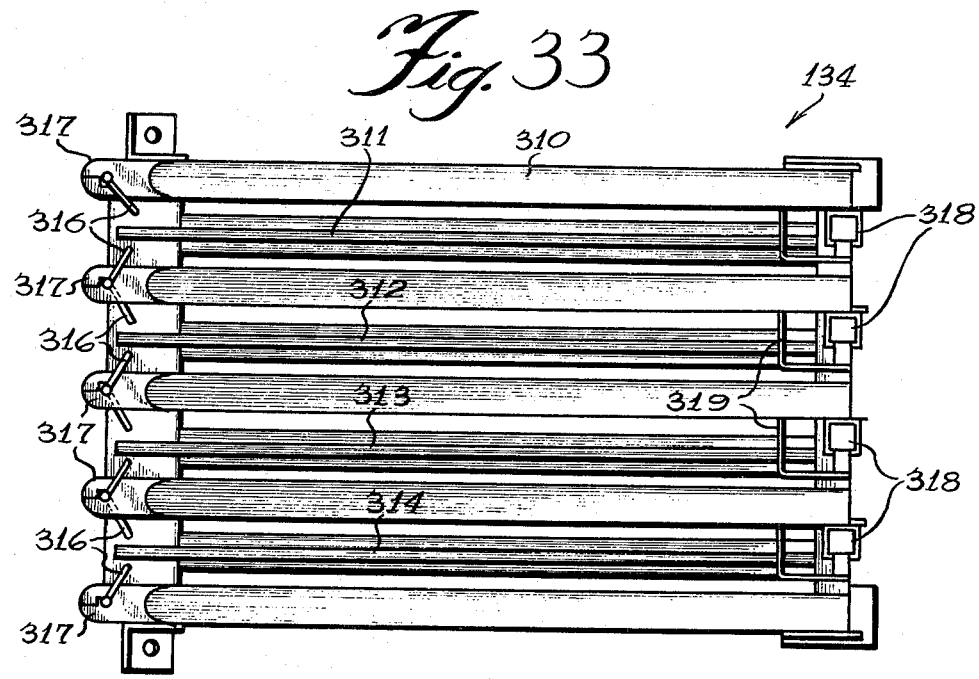

METHOD AND APPARATUS FOR COUNTING AND PACKAGING CAN ENDS

BACKGROUND OF THE INVENTION

The present invention relates generally to can end handling apparatus and more specifically to a method and apparatus capable of receiving a continuous flow of can ends either in stacked or unstacked relation, and delivering a stack of accurately precounted can ends to a bagging station for either manual or automatic bagging.

Briefly, can manufacture fabricate can bodies and can ends for sale to canneries, or the like, wherein the product to be packaged is disposed within the can body and sealed therein by securing to the open end thereof a mating can end. Seldom does the producer of a can product manufacture his own cans, and as such, he will purchase from a can manufacturer the necessary number of can bodies with one end attached, and a like number of separate but mating can ends for subsequent assembly. It is therefore necessary that the number of separate can ends delivered to the customer be approximately equal to the number of can bodies delivered, so that production runs are not interrupted due to an insufficient supply of ends.

In practice, the can bodies, which have one end thereof already closed with a can end, and can ends, for closing the other end, are delivered separately. The can ends are shipped in elongated kraft bags. Preferably, each bag shipped should contain a preselected number of ends. The size of the bags may vary from manufacturer to manufacturer and from customer to customer. Normally the can ends are shipped in lots or 300 or more. It is preferable that, regardless of the size of the bag, a preselected number of can ends be disposed in each bag so that an accurate count of the can ends delivered and the can ends on hand can be determined. As the number of can ends ordered generally run into the millions, manual counting of the can ends disposed in each bag is impractical. Can manufacturers in the past, have employed various methods of providing a general count of can ends in each bag, these methods are extremely imprecise and have resulting in serious logistical problems.

The technique normally employed in present day bagging to provide some semblance of an accurate count involves the correlation of a measured distance to a given number of ends. That is to say it is determined that X number of ends in stacked relation should be Y inches long. Accordingly, can ends are delivered to a trough in horizontally stacked relation and engaged against an abutment means. A pivotally mounted adjustable separator device in the form of a finger or thin blade is disposed a given distance (Y) from the abutment means against which the can ends rest. The separator device is moved toward the trough to engage the stack of can ends therein, thereby separating from the entire stack a portion thereof having a given length (Y), the separated stack portion presumably containing the desired number of ends. The separated portion is then removed from the trough and delivered to a packaging station wherein the ends are disposed manually within bags.

As can be appreciated, the above discussed method is extremely inaccurate for a number of reasons. First of all, it is essentially a manual operation and operator fatigue, inattentiveness or lack of concern will introduce error. Furthermore, the number of ends disposed within the confines of the separator means and the abutment means depend upon the degree of engagement or compression of the can ends. It has been found in practice, that the number of incidents of an undercount of can ends far exceeds an overcount.

When a manufacturer of a canned product receives a shipment of bagged can ends, which often number in the several millions of ends, a random sampling is taken of the bags and a handcount is effected as to the sample bags. The average shortage per bag is then determined as to the sampling, and this figure is employed as a statistical average per bag for the entire shipment. For example, an order of three million can ends, packaged 300 per bag, will be shipped in 10,000 bags. Assuming further, that a sample count determines an average shortage of two ends per bag, the customer will immediately request shipment of an additional 20,000 can ends to cover this average shortage. Canning plants are generally run on a substantially continuous basis and cannot afford disruption of a production run due to a shortage of can bodies or can ends.

These additional or make-up orders are extremely troublesome and costly to can manufacturers. While each makeup order is relatively small, the total number of such orders is a factor which increases the manufacturing cost of cans. For example, each makeup order must be handled individually which is a time consuming and costly procedure. Accordingly, it can be seen that there exists an urgent and real need for apparatus that can provide an accurately precounted stack of can ends for bagging, whether the bagging is accomplished manually or automatically. Of course, where automatic bagging is involved the saving is even greater.

The bagging of can ends, which as mentioned above, is now almost exclusively a manual operation, is an area which produces exceedingly high labor costs. This results, due to the fact that the present day can manufacturing apparatus can operate at speeds far in excess of that achievable by an operator. This manual bagging operation requires the operator to select a bag, slip it over a hollow bagging horn, and then manually push the counted stack of can ends into the bag, remove the bag and place it on a pallet. It can be seen that the number of bags that can be handled per hour or per shift by an operator is somewhat limited. With high speed can manufacturing lines, as are in operation presently, the bagging operation amounts to a bottleneck which can only be alleviated by employment of relatively large number of operators. In addition to the excessive labor costs, employment of a number of individual operator stations necessitates machinery for diverting the ends from a processing machine to the various bagging stations. This machinery further increases operating costs.

SUMMARY OF THE INVENTION

The above noted problems have been apparent to those in the industry for sometime and attempts have been made to provide apparatus that can automatically count as well as bag the can ends. Up to the time of the present invention, these prior art attempts had been unsuccessful in practice.

Briefly, the method and apparatus of the present invention provides means for introducing can ends to an input portion of a trough or guide means in stacked, continuous facewise engagement. The term stacked as used herein, and throughout the specifications and claims, applies to can ends in facewise engagements disposed horizontally as well as vertically. The stacked ends are then advanced along the trough wherein they are engaged by novel monitoring means of the present invention to produce a gap in the continuous stream thereof. The can ends are moved through this gap and are counted prior to restacking in said trough. Once the desired count is attained a separator device is employed to segregate counted stack from the additional incoming ends. The counted stack is then transferred to a packaging station for disposition within the bag element. According to one form of the invention packaging is done manually. A preferred embodiment envisions the complete automatic handling and bagging, the filled bags being delivered to a storage bag and the only manual operations required are the filling of the bag magazine and removal of the filled bags for loading.

DESCRIPTION OF THE DRAWINGS

FIG. 1 is a side elevational view of an automatic counting apparatus constructed in accordance with the present invention;

FIG. 2 is a top plan view of the apparatus of FIG. 1 illustrating in phantom the position assumed by an operator at the manual bagging station of the apparatus;

FIG. 3 is an enlarged fragmentary view of the receiving station of the apparatus of FIGS. 1 and 2;

FIG. 4 is a sectional view taken through the receiving station of the present apparatus along the line 4—4 of FIG. 2;

FIG. 5 is a sectional view taken along the line 5—5 of FIG. 4;

FIGS. 8 and 9 are partial elevational and planned views, respectively, of the means employed for producing an accurate control signal for each cam end passing the counting station;

FIG. 11 is a partial elevational view illustrating the preferred construction of the separator-drive mechanisms for handling a counted stack of ends;

FIG. 12 is a partial sectional view taken along line 12—12 of FIG. 11;

FIG. 17 is a partial elevational view of the rear portion of the machine adjacent the bagging station;

FIG. 18 is a top plan view of that section of the machine illustrated in FIG. 17;

FIG. 19 is a side elevational view of an alternate form of can end handling apparatus constructed in accordance with the principles of this invention;

FIG. 20 is a top view of the apparatus of FIG. 19;

FIG. 21 is a perspective diagrammatic representation of the sequence of operation of the can end handling apparatus of FIG. 19 showing the initial phases of can transport to a bagging station;

FIG. 22 is a second perspective diagrammatic showing the sequence of operation showing further steps in the bagging operation;

FIG. 23 is an enlarged fragmentary, partially sectional view showing the can receiving station, monitoring means, and can separator and transport means;

FIG. 27 is an enlarged elevational view showing the transport means of this invention for forwarding the counted and stacked can ends into a bagging station;

FIG. 28 is an enlarged elevational view showing a horn structure and bag holder for locating a receiving bag during the filling operation;

FIG. 29 is an end view of the bagging station of this invention;

FIG. 30 is an elevational view showing a filled bag handling transport carriage for removing the bags from the bagging station and inserting the bags into a receiving bay;

FIG. 31 is an end view of the bag transport carriage of FIG. 30;

FIG. 32 is a side elevational view of the bag receiving bay of this invention;

FIG. 33 is a top view of the bay of FIG. 30;

DETAILED DESCRIPTION OF THE ILLUSTRATED EMBODIMENT

Figure 6:
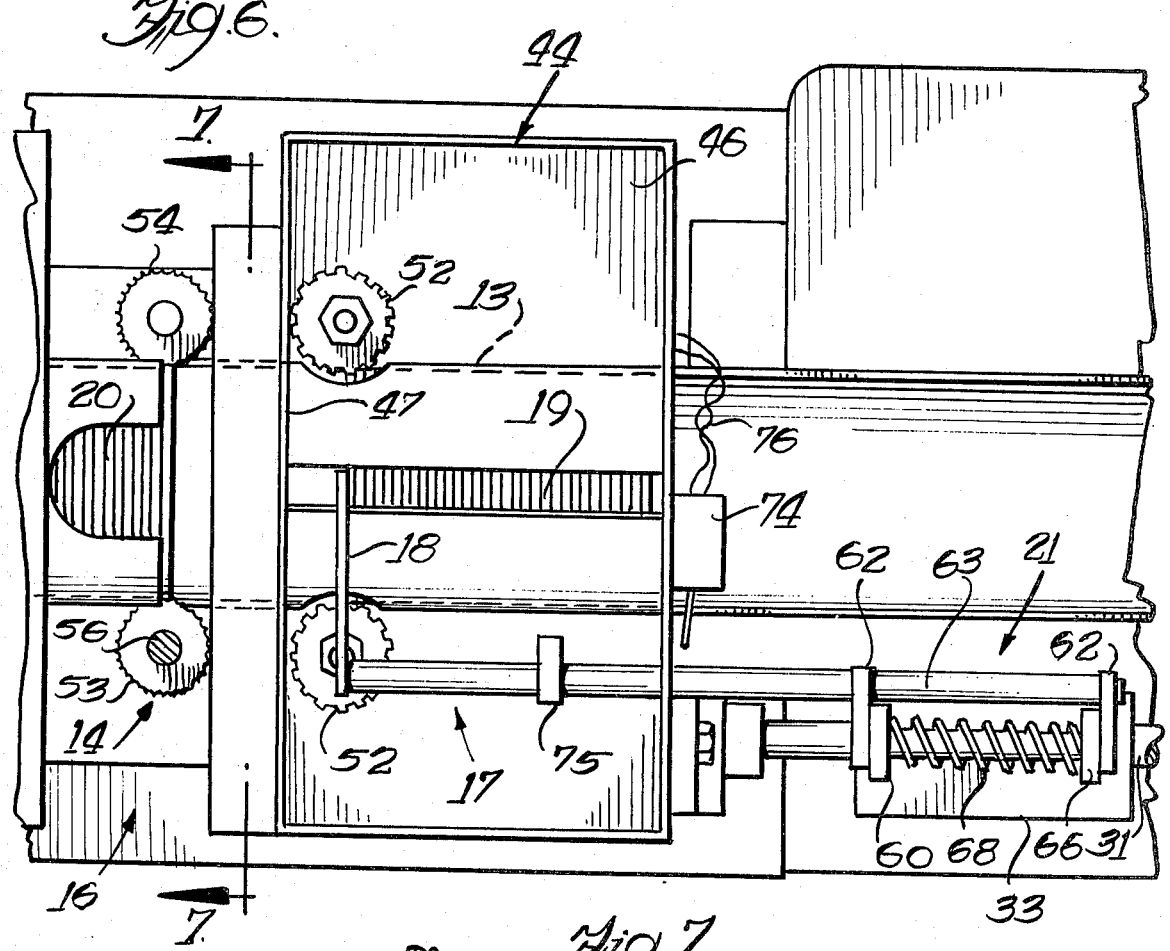
FIG. 6 is a top plan view of the can end monitoring apparatus and further illustrates the disposition of the separator-conveyor means.
Figure 7:
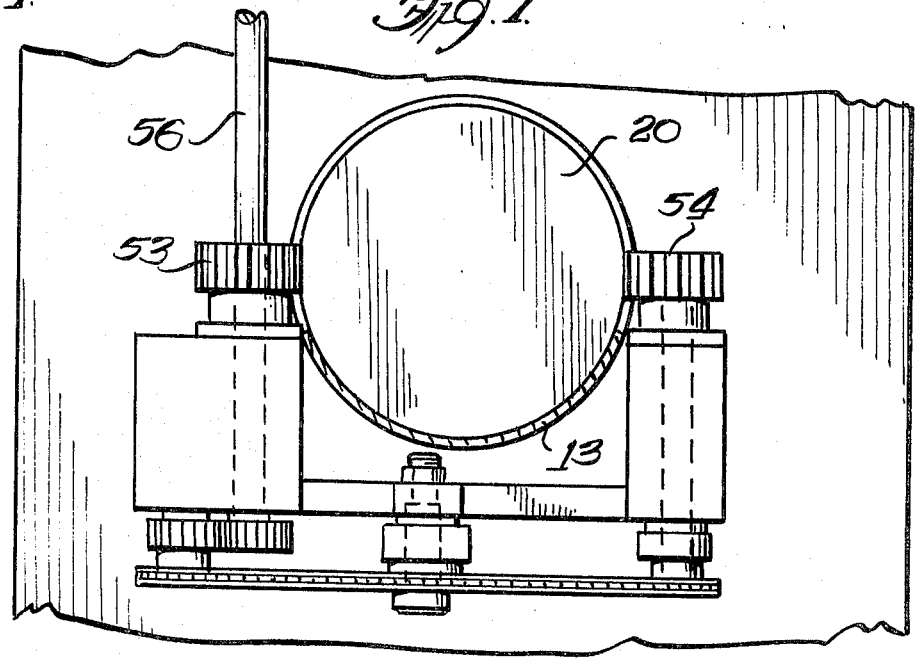
FIG. 7 is a sectional view taken along line 7—7 of FIG. 6.

Two embodiments of the present invention are illustrated in FIGS. 1–18 and 19–33, respectively. Referring first to FIGS. 1–18 of the drawings, semi-automatic counting and bagging apparatus constructed in accordance with the present invention is illustrated. In FIGS. 19–33, a modified, somewhat more sophisticated form of the invention is shown. For the purposes of discussion, attention will initially be directed to the apparatus of FIGS. 1–18, which is designated generally 10. The apparatus 10 envisions means for receiving a substantially continuous flow of can ends and providing a separated stack having a desired number of ends therein to a bagging station, wherein the bagging operation is effected manually. The machine of FIGS. 19–33, designated generally 125, on the other hand, employs the automatic bagging of can ends.

Turning attention to the machine 10 of FIGS. 1–18, the basic construction and mode of operation of said machine will be discussed initially with primary reference to FIGS. 1 and 2, with more detailed features of the apparatus 10 being set forth with reference to FIGS. 3–18. Turning now to FIGS. 1 and 2, a side elevational view of the apparatus 10 is shown in FIG. 1, while a top plan view of said apparatus is shown in FIG. 2. Regarding said FIG. 2, the position assumed by an operator pursuant to manual bagging of a stack of counted ends is illustrated in phantom.

Basically, the apparatus 10 includes a receiving station 11, having advancing and repositioning means 12 disposed at the forward or entering end of an elongate trough or guide means 13. Can ends are accepted by the receiving station 11 and disposed or fed into the trough 13 in stacked relation. Here again, it must be emphasized that the term "stacked" applies to horizontal as well as vertically disposed ends in facewise engagement. The can ends may be delivered to the receiving station 11 in stacked relation, but in practice, the can ends are normally delivered to the apparatus 10 after application of a liner compound to the inner rim thereof. Accordingly, the ends will arrive at the receiving station 11 disposed in spaced, edgewise relationship, as shown in FIGS. 1 and 2. The details of receiving station 11 will be discussed more fully hereinafter.

Disposed along the trough or guide means 13 is a monitoring station 14. The monitoring station 14, as one function, engages the stacked ends being advanced along trough 13 to provide a gap in the stream of ends, which gap is designated generally 16. Further, the monitoring station 14 also includes means for accurately counting each end as it passes through said gap 16.

More specifically, the monitoring apparatus 14 includes means for controlling the passage of can ends past a selected location and providing a detection signal for each can passing said location, i.e., gap 16, such there is provided a count as to the number of ends disposed axially along said trough rearwardly of said monitoring means. As will be explained further, the monitoring apparatus 14 is connected to control apparatus capable of receiving and counting the pulses delivered thereto and upon receipt of a preselected number of pulses, said control apparatus will produce a control signal for operation of separator means, designated generally 17, which is capable of segregating the counted stack of end, from the remainder of the continuous stream of ends in trough 13.

After a predetermined number of can ends have passed through the gap 16 and have been counted by the monitoring means 14, separator means 17, shown in detail in FIG. 6 is actuated so as to maintain separation between the counted stack and the continuous stream of can ends flowing into the section of trough 13, downstream from the said monitoring means. The separator means illustrated herein includes a finger member 18 which is inserted into the flow of can ends through the trough so as to separate the stacked can ends into a counted stack 19 and the continuous stream 20.

The separator means 17 is capable of isolating the counted stack 19 while it continues to move along the trough 13, and while a continuous stream of can ends is being inserted into the apparatus. In addition, separator means 17 includes a carriage structure 21 which is movable parallel to the trough 13 and has the finger member 18 pivotally carried thereon. The carriage 21 upon movement parallel to said trough and upon engagement of the finger 18 with a stack of ends, is thus capable of effecting movement of a counted stack along said trough to the next operating station, which is described hereinafter. The details of carriage 21 and the drive means operatively associated therewith will also be described.

Referring again to FIGS. 1 and 2, the apparatus 10 includes an operating station 28 positioned at a remote location relative to the receiving station 11 and designed to receive a counted stack of ends for bagging. In this regard, the counted stack of can ends is transferred along the trough 13 by transport or drive means associated with the carriage 21. The transport means includes a drive mechanism 33 to which the carriage 21 is secured. Driving force for the drive mechanism 33 is provided by a drive motor 30 operatively coupled to a rotatable shaft 31 by means of a chain. However, it will be understood that other suitable means for coupling the drive motor 32 and the rotatable shaft 31 may be incorporated. The drive mechanism 33 grippingly engages the rotatable shaft 31. The drive mechanism 33, which is of a known type, has angularly disposed friction gripping drive wheels placed about the rotatable shaft 31, see FIG. 10. As the shaft 31 rotates the angular disposition of the drive wheels will impart relative movement to the mechanism 33, the direction of rotation of said shaft determining the direction of travel of the drive mechanism. For example, one commercial type of drive mechanism which can be used to perform this function is that known as a Roh'lix drive unit. It will be understood that other drive means may be incorporated, as for example, the use of threaded shaft engaging a worm gear to transport the carriage assembly.

As seen in FIG. 2, the bagging station 28 includes a horn member 34 over which is positioned the open end of a kraft paper bag 36, illustrated in phantom lines, and which is positioned thereupon by an operator 37. The horn member 34 is arranged so that the counted stack of can ends can pass therethrough easily while being pushed into the elongated bag 36. The horn 34 may include means for insuring that the stacked can ends are maintained in upright abutting relation relative to one another as they are inserted into the bag. The bag is then folded over at its open end to secure the can ends therein. The trough section 13 extends along the length of the machine and is formed contiguous with a rearwardly disposed trough section 38, extending in alignment with said trough section 13, but movable relative thereto. An additional trough section 39 extends parallel to the movable trough section 38 and has the horn member 34 extending therefrom in the direction opposite the direction of travel of the counted stack of can ends. This arrangement substantially reduces the overall length of the machine, and saves valuable and expensive floor space. When the counted stack of can ends is transported along the trough 13 and into the movable trough section 38 a sensor 41 is actuated upon said stack coming to rest against a stop 29, thereby indicating that the counted stack of can ends is in position. Upon actuation of the sensor 41, the trough section 38 is pivoted away from the trough 13 and toward the adjacent parallel trough section 39, to transfer the counted stack to said section 39. In this regard, the first trough section 38 is provided with a pair of spaced apart hinge members 40 so that when the sensor 41 is actuated a hydraulic or air cylinder member 42 will rotate the trough section 38 about the hinges 40 as a result of its pivotal connection 43 with the hydraulic cylinder 42. While the hydraulic cylinder 42 is illustrated herein it will be understood that other suitable operating means may be connected to the pivotal portion of the trough for rotating the same about its hinged connection.

A repositioning station 44 is provided downstream of and immediately adjacent the monitoring apparatus 14. The repositioning station 44 receives the can ends after they are counted and have passed through gap 16 and again places the ends in face-wise stacked alignment with one another on the trough 13, preparatory for engagement and transfer by said separator means 17. This arrangement, viz, the creation of gap 16 and the counting of ends as they pass through said gap provides a slight time delay, sufficient to attain operation of the separator means 17 after the last end of a stack is counted, and before the next succeeding end is passed through said gap. Thus permitting the finger member 18 to be positioned within the trough effectively to separate the last end of one counted stack from the first end of the next succeeding stack.

The repositioning station 44 includes a chamber 46 (FIG. 6) which has an opening 47 thereof sized and arranged to admit can ends in face-wise relation to one another so as to form a longitudinal stack. An air evacuating blower system 48 (FIG. 1) is mounted at the lower portion of the apparatus 10 and includes a motor system and fan arrangement to draw air through the opening 47 and exhaust the air through an outlet duct 49. The same blower system 48 can be used in conjunction with the receiving station 11 to cause the can ends to be picked up from a conveying apparatus 51. In this regard, an initial stacking chamber 50 is provided at the receiving station 11, the construction and operation of which is substantially identical to that of station 44. As such, only station 44 will be discussed in detail, it being understood that station 50 operates in the same general manner.

To move the longitudinally stacked can ends 19 axially of the chamber 46, a pair of diametrically opposed drive wheels 52 are positioned on each side of the trough 13 and engages the perimeter of the can ends to drive the entire length of the stack along the trough. The counterrotation of the drive wheels 52 is at a selected rate sufficient to maintain the can ends in a vertical face-to-face relation as they are transported along the trough. Also it will be noted that the drive wheel 52 have gear-like face surfaces to insure sufficient frictional contact with the can ends. Further, in this regard, the blower system 48 will produce a continuous flow of air into chamber 46 through opening 47. Accordingly, as the can ends leave the monitoring station 14, as detailed hereinafter, they are drawn through gap 16 by said air flow and pulled into chamber 46 through opening 47. Upon entering chamber 46 the can ends engaged by the counter-rotating drive wheels 52 which places the individual ends into counted stack 19 and forces said stack along the adjacent section of trough 13.

Attention is now directed to the monitoring station 14 and its function with regard to the overall operation of apparatus 10. The monitoring station 14 includes a pair of opposed rollers 53 and 54 having a plurality of longitudinal grooves formed along their faces. The width of each groove is sized to receive but a single can end at its edge at a time. Also, the rollers 53 and 54 are not driven by external means but only rotate as a result of can ends being urged past said rollers, which movement is produced by the drive means employed with the initial stacking chamber 50. As the can ends pass the grooves of the rollers, each can end is separated from the adjacent ends of the stack and then enters gap 16, where it is drawn through said gap to the opening 47 of the chamber 46 as a result of the air being drawn into chamber 46 by blower system 48, as discussed above. Therefore, for each tooth or groove on the roller 53 and 54 there is represented the passage of a single can end through the gap 16, a shaft 56 is operatively coupled with roller 53 and extend upwardly thereof. The shaft 56 thus will rotate with roller 53 in direct relation to the rate of passage of ends through gap 16. As will be discussed hereinafter with regard to FIGS. 9 and 10, shaft 56 is effective to operate electronic apparatus providing a count as to the passage of ends through gap 16.

With relation to the overall operation of the machine 10, after the ends are counted and repositioned into counted stack 19, and the desired count of ends is achieved, the separation apparatus 17 is operated. In this regard, the finger member 18 is disposed inwardly of the chamber 46 to separate the last end in the counter stack from the ends then being received in chamber 46 and commencing to make up the next succeeding stack. In practice, it has been found that transfer to the complete counted stack should be delayed until a number of additional ends are received in chamber 46. Such is the case, in that if the drive mechanism for separator means 17 is actuated immediately after the count is reached, the incoming ends of the succeeding stack will not be supported and will topple over. Thus by delaying transfer, a number of the ends which will form the succeeding stack will accumulate in stacked relation in trough 13.

Figure 10:
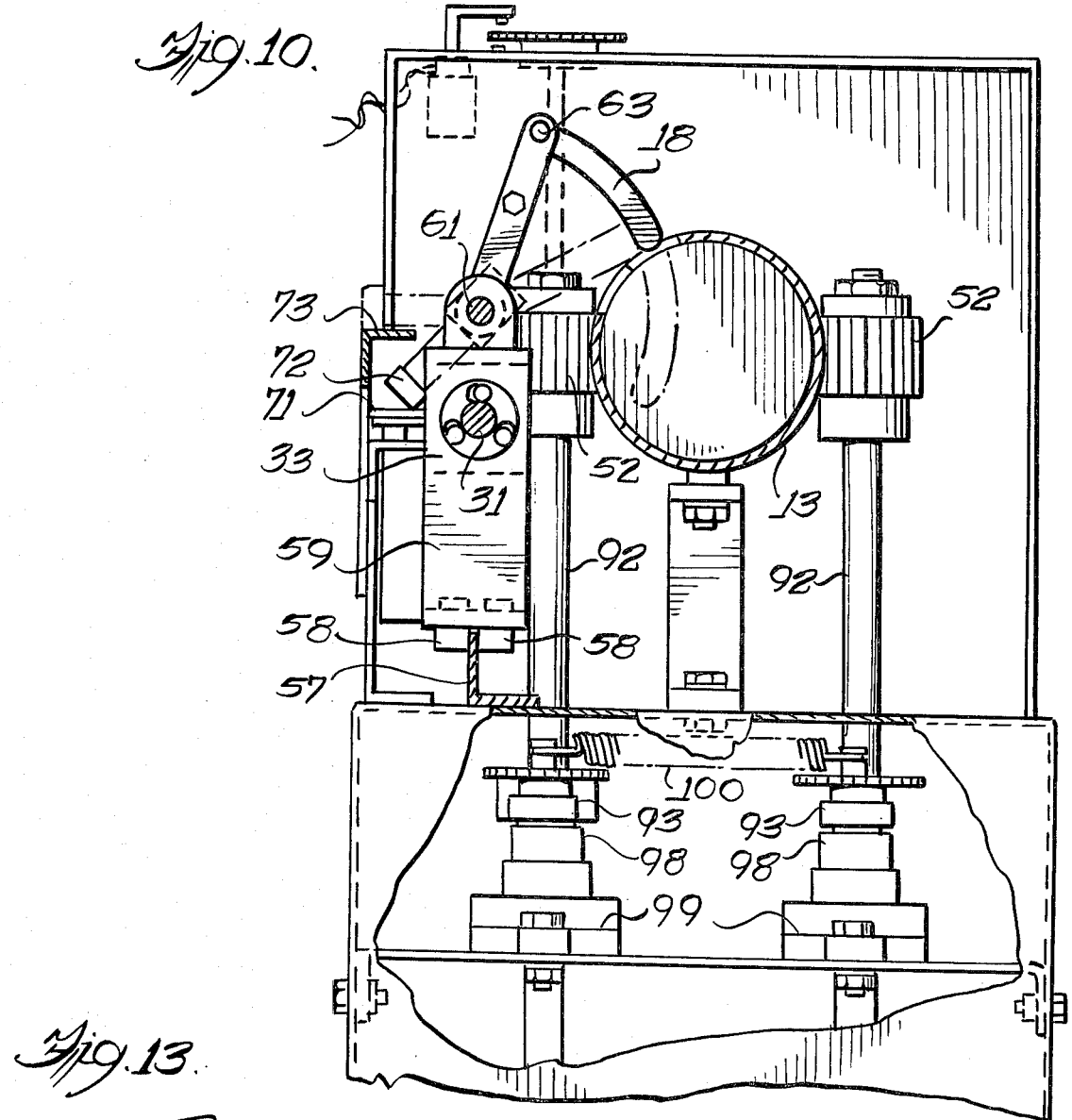
FIG. 10 is a sectional view taken along the line 10—10 of FIG. 2 illustrating the restacking station.

Discussion will now be directed to the general construction of the carriate assembly 21 associated with and forming part of separator means 17. In this regard, reference is now made particularly to FIGS. 3, 11, 12, and 13. The apparatus 10 includes a guide rail 57 extending along the length thereof and beginning at or near the region of the carriage 21 and terminating at the end of travel thereof near the packing station 28. The guide rail 57 is simply an L-shaped member extending parallel to the aforementioned drive shaft 31, and receives a pair of guide rollers 58 on opposite sides thereof. The guide rollers 58 are secured to a bent bent arm member 59 which, in turn, is fixedly secured to the previously discussed drive mechanism 33. By this connection and the operation of the drive mechanism 33, the entire carriage 21 is transported along the length of the machine 10. The carriage 21 further includes a pair of spaced apart bearing assemblies 60 which upwardly from the bent arm 59 and receive a pivotal shaft 61 therethrough. One or both of said bearing assemblies 60 include spring means (not shown) which tend to maintain carriage 21 and its elements in the full line position, as shown in FIG. 10. A pair of links 62 are connected to the shaft 61 outboard of each of the boss members 60 and extend upwardly to receive a rod 63. The links 62 are slidably engaged with the rod 63 so that relative longitudinal motion can be attained therebetween for a predetermined axial length. The rod 63 passes into chamber 46 of the repositioning means 44 through the upper end of an arcuately shaped opening 64 (see FIGS. 12 and 13) which roughly conforms to the configurations of the separator finger 18, which finger 18 is connected to the end of said rod disposed in chamber 46. Therefore, rod 63 and finger 18 can be moved into and out of chamber 46, through the opening 64 in an end wall of said chamber.

Figure 13:
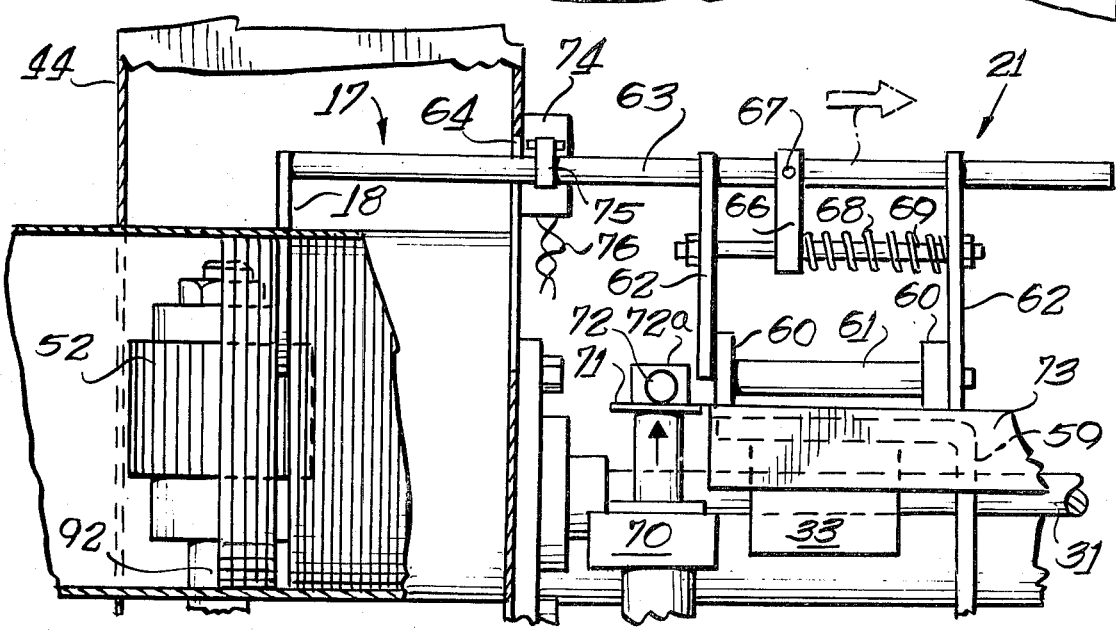
FIG. 13 is a partial sectional view similar to FIG. 11, but illustrating the manner in which the actuation of the conveyor means is attained.

With reference to FIG. 13, a block member 66 is fixedly secured to the rod 63 by means of a set screw or pin 67. The block member 66 is slidably engaged on a slide shaft 69 which shaft has a compression spring 68 coaxially mounted thereon and engaged against said block member 66. Thus, through the action of spring 69, block member 66 and similarly rod 63 are urged to the left, as viewed in FIGS. 6, 11 and 13.

From the above, it is believed apparent that the finger 18 must be maintained in an elevated position relative to the trough 13 until the desired count of ends is attained. This condition is illustrated in FIG. 10, in full lines and is achieved by employment of the aforementioned spring means (not shown) employed with bearing assemblies 60. Once the desired count is reached the pivotally mounted assembly which supports rod 63 and finger 18 is pivoted to the position shown in dotted outline in FIG. 10, to move finger 18 inwardly of trough 13. The mechanism for effecting said pivotal movement is illustrated in FIGS. 10, 11 and 13 and will now be considered.

When the desired count is reached, a control signal is obtained via the electronic means associated with monitoring station 14. This signal is used to energize an actuator member 70, preferably an air cylinder, having a support pad 71 associated therewith. The carriage assembly 21 includes a cam roller 72 connected to the pivotal arms 62 by means of an arm or link 72a. The cam roller 72 is disposed immediately above the support pad 71, so that upon operation of the actuator 70 the cam roller 72 will be moved upwardly. This upward movement produces a pivoting of the arms 62 about the shaft 61, moving finger 18 inwardly of trough 13 (see dotted outline FIG. 10). In addition, when the cam roller 72 is in the raised position, it will be at a level and alignmnnet so as to be engaged on the uppr surface of a cam rail 73 upon movement of the entire carriage assembly 21, in conjunction with transfer of the counted stack 19 to the bagging station 28. However, it must be kept in mind, as alluded to above and as explained immediately hereinafter, carriage 21 is not advanced immediately upon inward movement of the finter 18. Accordingly, the activator 70 will have to maintain cam roller 72 in aligned position with cam rail 73 for a short period of time prior to carriage movement. What happens during this period will now be considered and explained.

After the last can end of a given count has been received in chamber 46 and the finger 18 lowered into position, the flow of can ends will continue with the subsequently received ends being forced against the finger 18 by rollers 52-53. Due to the slidable mounting of rod 63 with respect to arms 62, said rod 63 and finger 18 can move longitudinally relative to the remainder of carriage 21. As illustrated in FIG. 13, this action is in opposition to the forces created by spring 68.

Mounted upon the rod 63 is a cam or actuator member 75, positioned to engage a switch 74. Therefore, after a predetermined number of can ends, for example, ten to twelve can ends, have been established behind the finger 18, rod 63 will have moved a sufficient distance so that switch 74 is engaged by the actuator member 75. The switch 74 is operatively coupled in circuit with the drive motor 30 by means of a pair of wires 76. Recalling the previous description of the drive arrangement for carriage 21, operation of drive motor 30 will produce rotation of shaft 31, which in turn causes the drive mechanism 33 to which carriage 21 is attached, to move along said shaft toward the bagging station 20. Further when carriage 21 is moved, the roller 72 will be disposed upon the cam rail 73 to maintain the carriage in its actuated condition after leaving the support pad 71.

The time delay obtained by delaying energization of the drive motor 30 until some time after the prescribed number of can ends have been counted and separated from the continuous flow of can ends allows the beginning portion of the next counted stack of can ends to be substantially self-supporting as it builds up in trough 13.

Figure 14:
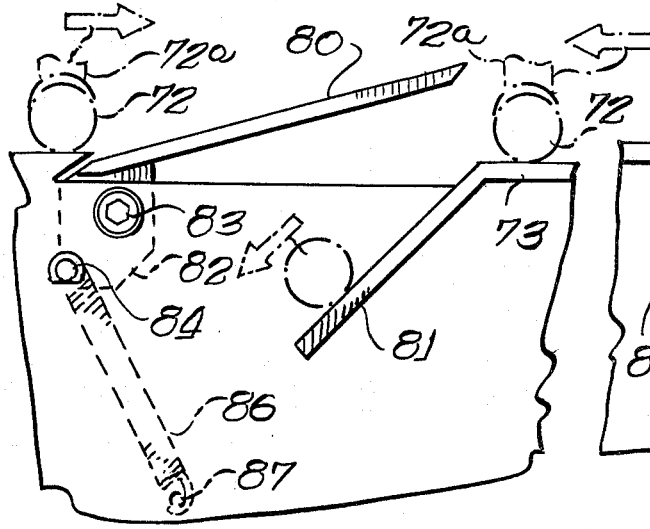
FIGS. 14 and 15 illustrate cam means employed for controlling pivotal movement of the separator blade as it is returned to its initial position.
Figure 15:
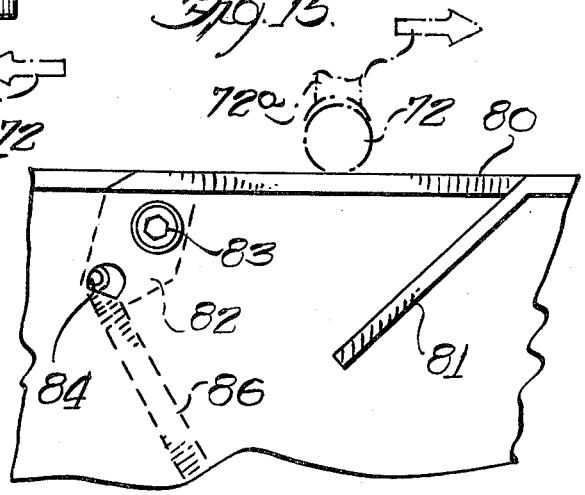

After the counted stack of can ends is transported to the bagging station 28, the carriage 21 must return to it initial position preparatory to the next cycle of operation. In this regard, the drive mechanism 33 must be reversed to cause carriage 21 to move from station 28 to station 44. This is obtained by reversal of the rotation of the shaft 31, all controlled by limit switches or the like (not shown). However, pursuant to the reverse movement of carriage 21, finger 18 must be raised out of trough 13, least it will strike the leading can ends of the oncoming stack being assembled in trough 13. This is accomplished by providing a door element 80 in the cam rail 73, which is spring biased to an open condition as best illustrated in FIGS. 14 and 15. The path of travel of the cam roller 72 toward and away from the bagging station is illustrated in phantom lines. As shown in FIG. 14 as cam roller 72 approaches the spring biased door 80, same is biased closed as a result of the weight of the carriage 21. In FIG. 15 the door 80 is shown closed as the cam follower continues its travel toward the bagging station. However, after the cam follower 72 passes over the door it springs inward to an open condition, as shown in FIG. 14. Therefore, on the return movement of carriage 21, cam follower 72 will encounter an open door 80, and due to the spring effect of bearing assemblies 60, said roller follows a descending sloped member 81 thereby rotating the entire carriage about the pivot shaft 61 so that the separator finger 18 is raised above trough 13. Upon the carriage 21 reaching the restacking station 44, the drive motor 30 is automatically de-energized, and the cam follower 72 will again be positioned above the support pad 71 as shown in FIG. 13 preparatory to the next operating cycle. The spring biased door 80 has a depending tab member 82 pivotally secured to the cam rail by means of a cap screw 83. Anchor means 84 are formed on the depending member 82 and receives one end of a spring element 86. The other end of the spring element is connected to another anchor means 87 on the cam rail. It will be understood that repositioning of the carriage 21 back to its initial condition while traversing the carriage back toward the counted stack of can ends can be accomplished by other means.

For a better understanding of the can end transport advancing means associated with the initial stacking station 50 and restacking station 44 reference is now made to FIGS. 3, 5, 6 and 10. In this regard, the drive wheels 12 of station 50 and drive wheels of station 44 and their means of transmitting power to the longitudinally transported stack of can ends are illustrated. The drive wheels 12 are connected to depending shaft members 90, one of which may be connected to a suitable drive motor or the like. Secured to the shafts 90 are sprocket gears 91 these gears being located below the initial chamber 50. Within the restacking chamber 44 the drive wheels 52 have depending shafts 92 extending therefrom and have sprocket gears 93 secured to the shafts at approximately the same height as the sprocket gears 91. An idler gear 96 extends from a support arm and provides means for tensioning a power transmitting chain 97 FIG. 3, wrapped about all of the sprocket gears. The shafts 92 are rotatably mounted to a flexible coupling 98 which, in turn, is mounted to a journalled support member 99 bolted or otherwise fastened to a support plate. The shafts 92 and rollers 52 are thus free to move toward and away from each other, but are urged toward one another by a tension spring 100 engaging the shafts near their lower ends, as best seen in FIG. 10. By so urging the shafts 92 toward one another so also are the drive gears 52 urged into firm contact with the edge portions of the can ends being transported. The drive gears 12 are also driven through a flexible connection, similar to that as is shown in FIG. 10 with regard to drive wheels, although the details thereof have not been included.

As best seen in FIGS. 3, 6, 7, 8, 9 and 10, the details of construction of the monitoring means 14 can be more readily appreciated. Here the counter-rotating opposed rollers 53 have finely spaced teeth which cause separation of each can end as it passes into gap 16. Once the can end is so separated from its longitudinal continuous stack, it will fly across the gap 16 as a result of air being drawn through the opening 47 in the restacking chamer 46, as described above. The separated can end is counted during this operation.

To accomplish counting, one of the opposed separator rollers 53–54 is provided with an upstanding shaft 56 as mentioned previously. Attached to the upper end of shaft 56 is a segmented rotating counting wheel 103. The counting wheel 103 has a plurality of notches or apertures 104 formed about the periphery thereof, each aperture or notch corresponding to but a single one of the teeth or grooves on the separator wheel 53. Therefore, for each can end that is separated from the continuous stack of can ends 20 and passed through gap 16, there is represented a single notch 104 in the periphery of the counting wheel 103. A U-shaped support member 106 is positioned adjacent the counting wheel 103 and has extending arm members 107 and 108 for supporting a light source 109 and a light responsive detector 110, respectively. As the counting wheel 103 rotates past the light source and light detector the light beam is alternately interrupted and reestablished as a result of the notched configuration of wheel 103. Each electrical impulse provided at the output of the light responsive means 110 will represent a can end, and these pulses will be accumulated in a control circuit (not shown). After a predetermined number of counts has been accomplished, the control circuit will energize the actuator 70 to dispose blade 18 in the trough 13. This is then immediately separates a counted stack of can ends having the desired numbers of ends from the continuous flow of can ends entering the restacking station 44.

As an additional point, the time delay for operation of the carriage drive 30 provided by the spring biased carriage 21 switch 75 and actuator 74 as discussed previously, can be alternately accomplished by the control circuit. In this regard, after the separator finger 18 has been lowered into position, a prescribed number of ends will be allowed to accumulate up stream of finger 18; and the counting circuit will energize the drive motor 30 for rotating the shaft 31 and movement of carriage 21.

As best seen in FIGS. 14 and 5, the can ends are drawn into the stacking and restacking chambers 50 and 44, respectively, as a result of high volume air flow through their inlet openings. The inlet openings of these chambers are in fluid communication with the blower system 48 through port openings 111 and 112 formed in trough 13.

Figure 16:
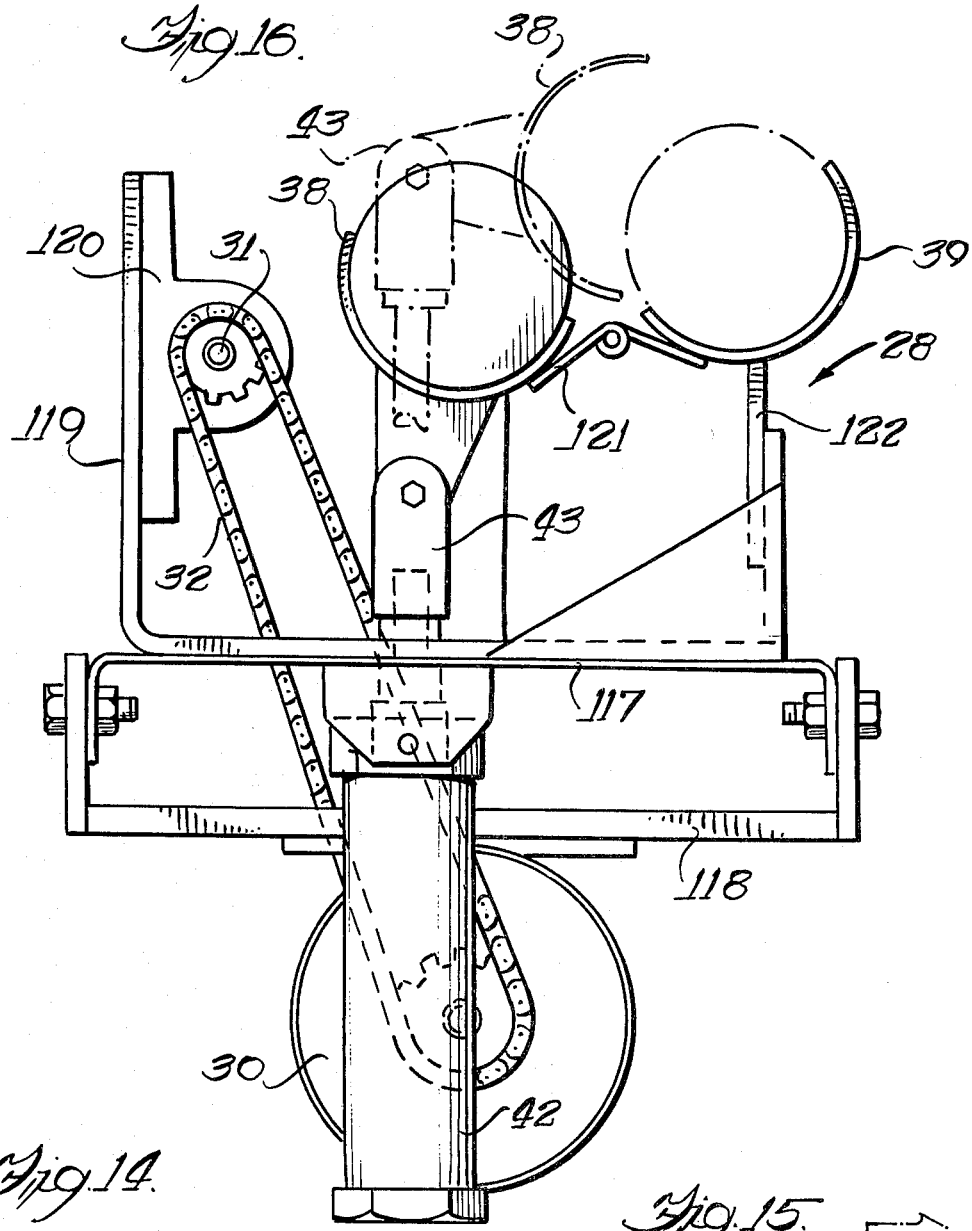
FIG. 16 is a partial sectional view taken along the line 16—16 of FIG. 1 and illustrating the apparatus employed in diverting a counted stack of can ends to the bagging station.

Referring now to FIGS. 16, 17 and 18 the details of the bagging station 28 will be discussed. From the prior discussion of FIGS. 1 and 2, it will be recalled that the rewardly disposed trough section 38 receives the counted stack of can ends and is pivoted by the actuator 42 to dump the can ends into the adjacent, parallel trough section 39. Either before or after this is accomplished, an operator 37 slips an empty bag 36 over the horn 34 and after transfer of the counted stack to trough 39, manually pushes the stack of can ends into the bag 36. The filled bag is then removed and placed on a pallet for shipment.

While the FIGS. 16–18 illustrate a preferred construction, station 28 can vary from that shown on the drawings. The specific structure here however, utilizes a standard 116 (FIG. 17) upon which is supported a U-shaped plate 117 having a cross bar 118 connected thereto. As can be seen in FIG. 17, the drive motor 30 for the carriage drive is supported by the aforementioned cross bar 118. Looking to FIG. 16, an L-shaped bracket 119 is secured to the plate 117 and supports a journal member 120 through which the drive shaft 31 is supported. The rearwardly disposed trough member 38 is pivotally secured in place by means of a hinge element 121 which, in turn, is fastened to the adjacent parallel trough member 39, said trough member 39 is rigidly supported on the plate 117 by means of an upwardly extending bracket or brace 122.

The actuator 42, for producing pivotal movement of the trough section 38 is also mounted to plate 117. As such, when said actuator 42 is energized, the operating arm thereof will move upwardly, and due to the pivotal link 43 and the action of hinge 121, the trough section 38 will pivot to the position illustrated in phantom in FIG. 16. As shown, this will correspondingly cause the counted stack of ends to be transferred to trough 39, for subsequent bagging.

Thus reviewing the herein setforth discussion with regard to FIGS. 1–8, it will be seen that there is provided a machine that can automatically accept a continuous flow of can ends in edgewise engagement, stack these ends, count out a prescribed number of ends, and deliver the counted ends in stacked relation to a bagging station. All that the operator 37 need due is handle the bags and manually dispose the ends in the bag elements. Thus, the human error factor, as well as other error factors inherent in prior art machines for this purpose have been eliminated.

Referring now to FIGS. 19–33 there is illustrated a further modified machine, capable of complete automatic can handling counting and bagging. This machine is designated generally by reference numeral 125. The can end handling apparatus 125 is capable of receiving a generally continuous supply of can ends from conveyor and automatically counting and separating the can ends into counted stacks, and then completely automatically bagging and storing the stacked can ends.

In this regard, with reference to the prior discussion of the machine of FIGS. 1-18, the initial stacking operation (performed at stacker station 128) and the counting and restacking operation (performed at counter-restacker station 129) are achieved in generally the same manner as with the previously discussed machine 10. Basically, the machine 125 proceeds beyond the concept of machine 10 by the provision of a mode of operation and apparatus which attain automatic handling of the bag element and the bagging operation, and then automatically store the packages, counted stack of ends.

Looking now to the practical aspect of the machine 125, an operator need only remove the filled bags from the storage bay and place them on a pallet. There is no longer any need for an operator to engage in the tedious chore of opening bags, placing the opened bag over a horn, and manually disposing the ends within the bag and remove the filled bag from the horn. Accordingly, where a single operator could handle but one line with manual counter baggers and possibly two lines with the semi-automatic machine 10 of FIGS. 1-10, with the present machine 125, a single operator can service upwardly of 2-3 lines. Further, as the manual factors are reduced, the speed of operation may be increased, to enchance further the economic advantages of the present invention.

Initially, to appreciate the general construction and operation of the machine 125, reference will be had to FIGS. 19-22. In this regard, FIGS. 19 and 20 illustrate the basic construction of the machine 125, while FIGS. 21 and 22 are diagrammatic representations of the operating cycle or method by which the can ends are automatically handled.

Attention is first directed to FIGS. 19-20 and the general overall construction of machine 125. Accordingly, to achieve and facilitate handling, the apparatus 125 includes an elongated guide means 126 constructed in the form of a U-shaped trough which extends along the longitudinal direction of the machine. A bag handling and bagging station 127 is located proximate a rear portion of the guide means 126 for receiving a counted stack of can ends and automatically handling the can ends so as to bag and store them for ultimate shipment. A receiving station 128 is proximate the forward end of the guide means 126 for receiving and longitudinally stacking ends in trough 126. Counting and restacking apparatus is employed at 129 for handling the ends and separating them into counted stacks for transport to the bagging station 127. The counting and restacking means at 129 is spaced from the receiving station 128 and includes means for engaging the can ends to provide a gap in the continuous flow of ends at a determined point along the path of travel of the ends through the machine 125. Once the can ends have been counted they are separated by a separator-first transport mechanism 131 which initially transports the counted can ends a partial distance along the trough 126 to a point where a second transport unit 130 ultimately engages the can ends for further transport along the trough to the bagging station 127. When the separator-first transport mechanism 131 departs from the counted stack of can ends the second transport mechanism 130 will engage the can ends to push them along the trough while simultaneously the separator 130 is being retracted to its initial position for again engaging a subsequent counted stack of can ends. The second transport mechanism 130 is employed in conjunction with the bagging station 127 to dispose the can ends in a bag element.

Disposed adjacent the bagging station 127 is a bag carriage assembly 133. The assembly receives a filled bag in a horizontal disposition, and transfers the bag to a bag storage unit 134, wherein the filled bags are positioned generally vertically, whereby an operator can remove the filled bags and stack them on pallets for shipment to the ultimate user.

In practice, the can ends are delivered to the apparatus 125 for bagging from a machine that applies sealant material to the end preparatory to its attachment to a can body. As such, the can end handling apparatus 125 may further include an inspection station 132 interposed between the receiving station and the monitoring means 129. The inspection station includes means for rotating the can ends about the longitudinal axis of the stack, so that an operator can check and remove any objectionable ends.

For a better understanding of the sequence of operation of the machine 125 illustrated in FIGS. 19 and 20, reference will now be made to FIGS. 21 and 22 which are diagrammatic in representation, but clearly show the method by which the can ends are automatically handled.

The machine 125 employs an initial stacker 128 which is similar to that of the machine 10 of FIGS. 1-18 and receives the ends in edgewise orientation from a line applying machine, or the like, and stacks the ends longitudinally in the trough 126 while advancing them along said trough. After initial stacking the can ends are delivered to the inspection station 132 whereupon they are rotated, so that visual inspection can be made, if desired. Next, the ends are moved along to the counter and restacker station 129. Here again, similar to the machine of FIGS. 1-18, the ends are engaged by separator rollers to provide a gap in the continuous stream of ends. The rollers allow the ends to pass through the gap one at a time to the restacking chamber of station 129. Upon sensing a predetermined count of can ends, the transport-separator 131 is actuated. The depending finger mechanism 136 of the separator 131 is pivoted inwardly of trough 126 so as to be inserted into the flow or stream of can ends in the counter-restacker 129 at a time when the ends downstream of said separator 131 corresponds to a predetermined count. The separator machine 131 is then actuated to transport the counted stack of can ends, illustrated by reference numeral 137, in the direction of the bagging station 127. At an intermediate point along the path of travel of the counted can ends in trough 126, the separator mechanism 131 departs from engagement with the counted stack 137 and retracts to its initial position, as illustrated in FIG. 22. At this point in the sequence of the operation cycle, the second transport mechanism 130 is activated. The mechanism 130 has a push rod 138 thereon, which, when actuated drops into engagement with the last can end at the rear of the counted stack and upon movement of the mechanism 130 will push the entire stack further along the transport path provided by trough 126.

Prior to the operation of the second transport mechanism 130, the apparatus at the bagging station 127 is employed to remove a bag 139 from the bag magazine. The removal bag is then opened, and a horn member (not shown in FIGS. 21 and 22) coaxially mounted on trough 126 is disposed within the open mouth the bag. Accordingly, as the second transport mechanism 130 advances, the push rod 138 will advance the stack 137 of counted ends through the horn and into an awaiting partially open elongated bag 139, as shown in FIG. 22. The second transport mechanism 131, and its associated push rod 138 are then retracted to their initial position to await a subsequent counted stack of can ends. The filled bag at station 127 is transferred to the carriage assembly 133 (FIG. 20) where it is rotated from a horizontal orientation to a somewhat vertical position by said carriage assembly 133 and then transported into the filled bag storage bay 134. To insure that can ends will not fall out of the filled bag, a bag closing mechanism 140 is actuated just prior to removal of the bag from its can end receiving position. The closing mechanism 140 may be an electric or hydraulic actuated device having a blunt extended member directed transversely of the elongated bag and actuated to fold over the bag after the push rod 138 has been retracted.

Referring now to FIG. 23, details of the initial stacker or receiving station 128, monitoring and restacking station 129, and inspection station 132 are shown. The monitoring and restacking station 129 includes a pair of free running diametrically opposed rollers 141 each having a plurality of longitudinal grooves formed therein. Each of the grooves of the rollers 141 is of a size to receive but a single can end edge at a time. The rollers are synchronized to engage the continuous stream of stacked can ends in trough 126 and provide a gap therein. In this regard, the ends are separated from the stack and allowed to pass one at a time through the gap as they are delivered to a pneumatic restacking housing 142. As the can ends are so separated and pass through the gap they are counted by counting means 143 operatively coupled to one of the rollers 141 by means of a universal link connection 144. The counter means 143 preferably has a light responsive detector and light source which is interrupted as a result of a peripheral portion of a counting wheel having apertures or slots formed about the periphery thereof, substantially similar to that disclosed in FIGS. 8 and 9. The link means 144 is operatively connected to the disc so that it rotates in synchronization with one of the separate rollers 141. The counting means 143 includes means for receiving the light produced pulses and thereby producing control signals upon sensing a predetermined number of such pulses so as to trigger operation of subsequent sequences of the machine.

The restacking housing or unit 142 includes a chamber 146 through which air is evacuated so as to draw the counted can ends into said chamber wherein they are placed in a longitudinal stack. The initial stacking station 128 also operates in a similar manner as discussed more fully hereinafter. To attain the desired drawing of the can ends into the chamber 147, an opening is provided at one end and an exit opening 148 at the other end of the chamber, and the air flow within the chamber is controlled so that can ends are easily drawn into the entrance opening and wherein can ends are not restricted from leaving the exit opening. Air evacuating means 149, shown generally in FIG. 19 is provided to effect the evacuation of air through the chamber 146. Therefore, the can ends are restacked in a longitudinal stack in the trough 126 in the manner as previously described. To effect transport of the ends downstream of chamber 146, drive means 150 is provided, which comprises drive gears 151 connected to upstanding shaft members 152 on each side of the trough 126. The shaft members 152 are driven by a motor 153. The drive gears 151 of the restacking station are connected to similar type drive gear 158 of the stacking station, the two groups of drive gears being interconnected by means of a gear and chain. To this end an idler gear 154 is biased in a direction to maintain tension on a chain 155 which, in turn, is wrapped about a sprocket 156 connected to the shaft 157. The shaft 157 is connected to the drive gear 158 at the stacking station. Similarly, the air evacuating means 149 is operatively coupled with the initial stacking station to produce an air flow, as illustrated.

The inspection station 132 is provided so that visual inspection of can end edges can be made as the stacked can ends pass through the automatic counting and bagging apparatus. This is often desirable since can end edges sometimes become covered with excess sealant material protruding from the can periphery. When such is the case an inspector-operator merely reaches down and lifts off and removes the undesired can ends. To facilitate inspection, means are provided to engage and roll the can ends about their longitudinal axis of the stack, said means comprising rollers 160 and 161 which extend into trough 126 intermediate stations 128 and 129. The rollers 160 and 161 are driven together by means of a chain drive 162 which pass over sprockets associated with each of the rollers. The rollers are supported by depending bearing structures 163 mounted at each end thereof.

Figure 24:
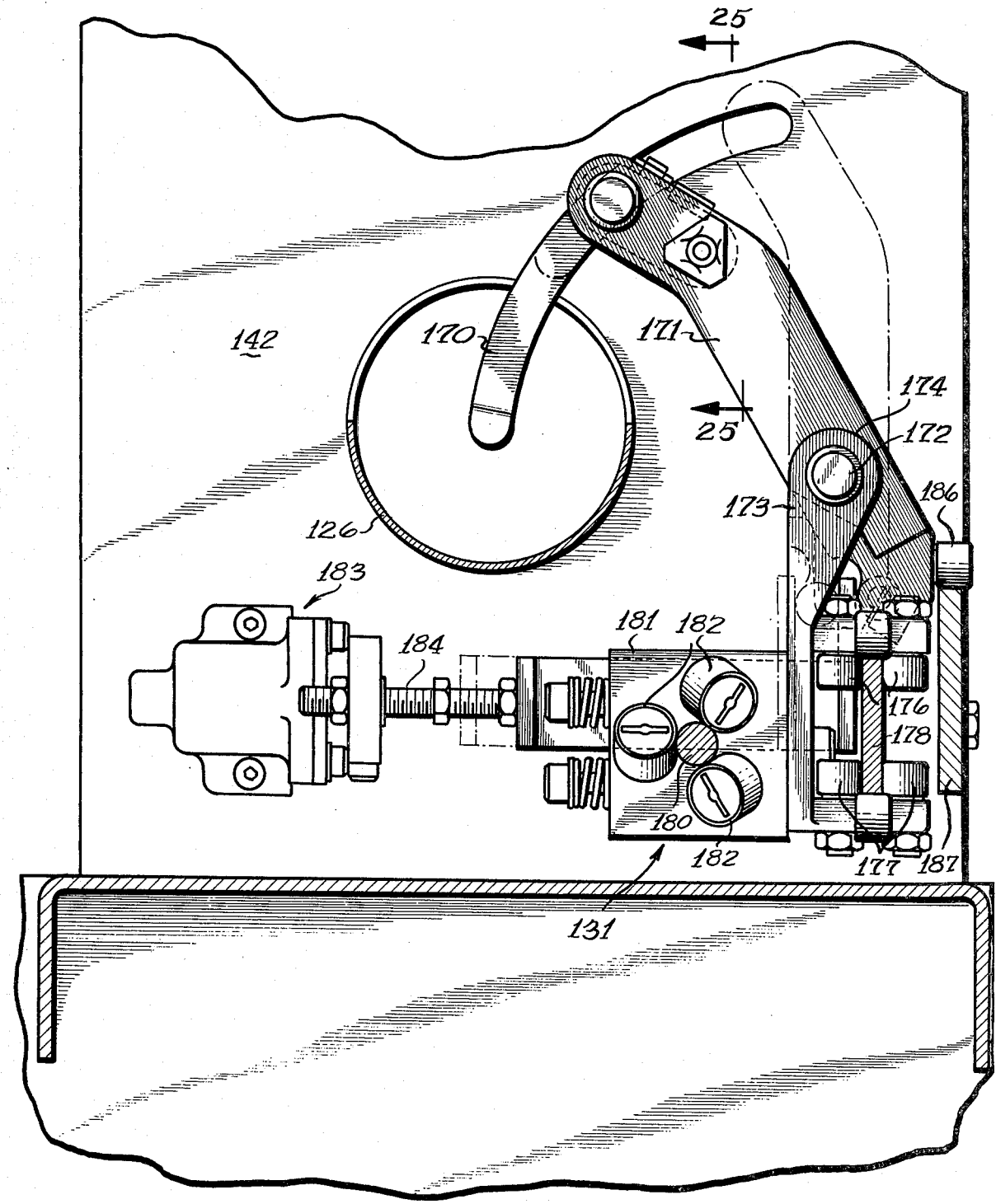
FIG. 24 is a sectional view taken along line 24—24 of FIG. 19.

Referring now to FIG. 24 an end view of the separator and first transport mechanism 131 is shown substantially taken along line 24—24 of FIG. 19. The separator mechanism 131 includes a movable downwardly directed finger 170 connected to a pivotal arm 171. The pivotal arm 171 moves about its pivotal axis which is defined by a transverse mounting pin 172 passing through a bracket assembly 173 having bearing portions 174.

The bracket 173 further has mounted thereto a pair of upper guide rollers 176 and a pair of lower guide rollers 177 to engage a longitudinally disposed vertically directed guide rail 178. The guide rollers and guide rail allow free movement of the separator structure 131 of along a path parallel to the longitudinal axis of the machine and trough 126.

The drive unit for the separator transport mechanism 131 is similar to that discussed previously in that a Rohlix type system is used. More specifically, an elongate rotatable shaft 180 is provided which has a drive mechanism 181 mounted thereon and adapted to be transported along the shaft as said shaft 180 rotates. The driven mechanism 181 is secured to the bracket 173 thereby transporting the entire unit longitudinally of the guide rail 178. The operation of the drive mechanism 181 is accomplished by providing front and rear sets of three angularly disposed friction gripping rollers 182 which engage the peripheral surface of the shaft 180. The nature of the angular disposition of the rollers 182 cause the mechanism 181 with bracket 173 attached, to move along the shaft.

The pivotal arm 171 and finger element 170 as shown in FIG. 24, are in the operation condition. The phantom outline of FIG. 24 illustrates the position assumed by the mechanism 131, prior to pivotal movement. Once the starting signal is generated viz., when a predetermined number of can ends have been counted, a first signal will energize an actuating mechanism 183 which has extending therefrom a push rod 184. The push rod 184 engages a downwardly directed portion of the pivotal arm 171 to rotate the arm from the position illustrated in phantom to that shown in full line, said arm pivoting about the pivot pin 172 against the action of springs tending to maintain the arm 171 in a raised position. This movement raises a cam roller 186 attached to the arm 171 upwardly from its rest position, as shown in broken lines in the figure to a position as shown in solid lines, to the same height as a cam rail 187. The pivotal arm 171 is held in position for a predetermined time interval by the actuating mechanism 183. When the drive mechanism 181 is advanced the cam roller 186 will be engaged upon the top surface of the cam rail 187, thus engagement maintaining the pivotal arm 171 firmly in its engaged position. After a predetermined distance of travel, as illustrated in the diagrammatic representations of FIGS. 21 and 22, the shaft 180 stops rotating and the movement of the separator-transport mechanism 131 stops. A signal is effected to cause reversal of the drive motor connected to shaft 180 thereby reversing its direction of rotation so that the drive mechanism 181 will retreat to its initial position. As was the case with the corresponding pivotal arm of the embodiment of FIGS. 1–18, it is necessary to raise the pivotal arm 171 on the return movement this being attained primarily by the aforementioned spring means. However, to effect this end, the cam roller 186 must be removed from the upper surface of cam rail 187, which rail will employ a spring biased door arrangement, similar to that illustrated in, and discussed with regard to FIGS. 14 and 15. Since the operation of this spring biased door arrangement is identical to that previously discussed, specific illustrations thereof has not been included, it being understood that similar or equivalent structures must be employed to raise the arm 171 on return movement.

Figure 25:
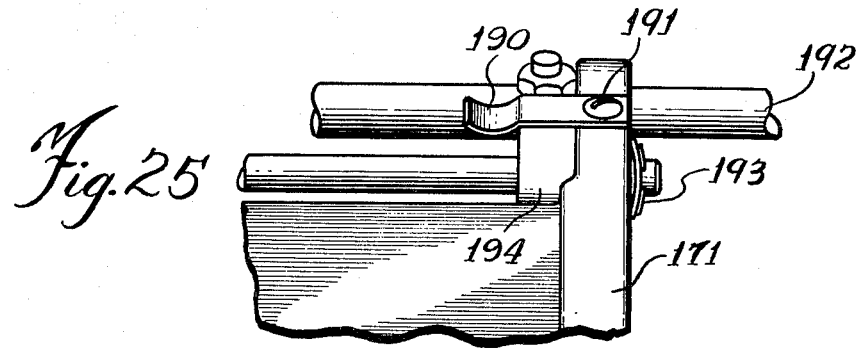
FIG. 25 is a fragmentary view showing positive locations means for the separator arm of FIG. 24 and taken substantially along line 25—25 of FIG. 24.

FIG. 25. shows a spring bias clip member 190 secured to the pivotal arm 171 by a screw 191. Extending from the arm 190 is a rod 192, the other end of which receives the depending finger 170 of FIG. 24. The spring clip 190 engages a boss member 194 to firmly hold the separator mechanism 131 in the desired initial position, and prevents any premature movement due to vibrations or the like. That is to say, the clip member 190 will maintain the blade 170 in general alignment with the drive rollers 151 (See FIG. 23) for proper engagement upon actuation of the separator mechanism 13.

Figure 26:
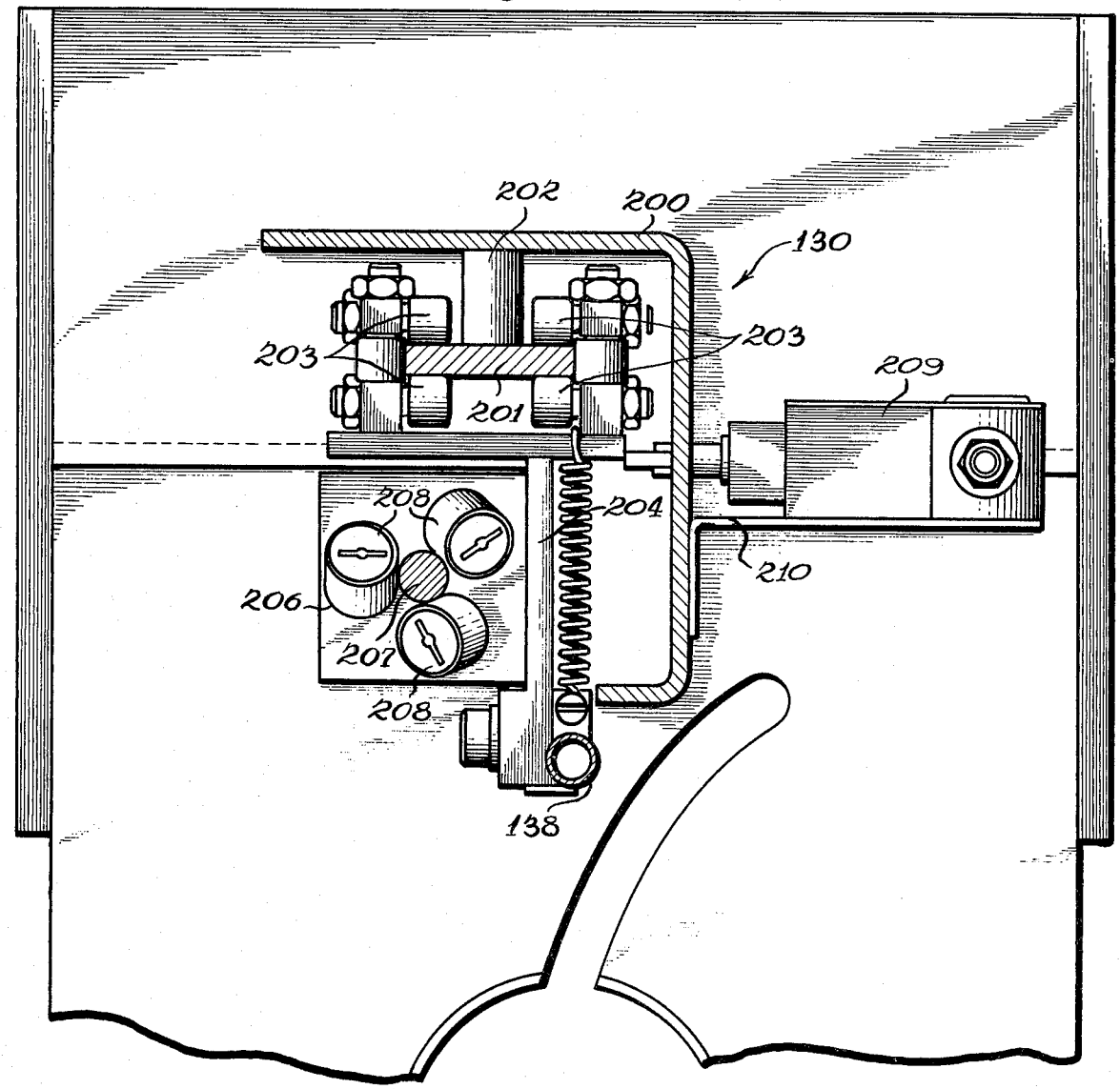
FIG. 26 is an enlarged fragmentary sectional view taken along line 26—26 of FIG. 19.

Once the counted stack of can ends is transported along trough 126 the prescribed distance separator-first transport mechanism will retreat to its initial position, and the second transport mechanism 130 is automatically actuated to effect further transport of the counted can ends along the trough. An end view of the second transport mechanism 130 is shown in FIG. 26, while a side elevational view thereof is shown in FIG. 27. The second transport mechanism 130 moves along a channel shaped support beam 200 from which is secured a guide rail 201. The guide rail 201 depends from the inner channel portion of the support beam and is maintained by a plurality of post members 202. A plurality of guide rollers 203 are secured to a movable bracket 204 and arranged on opposite sides of the guide rail to travel therealong with minimum lateral play or displacement along the longitudinal extent of of the machine. An actuating or drive mechanism 206 of the Rohlix type is also secured to the bracket 204 and receives therethrough a rotatable shaft 207. To effect movement of the mechanism, shaft 207 is rotated, causing the engaged friction pressure rollers 208 also to rotate, which rollers 208 due to their angular disposition, effect movement of the entire mechanism along the length of the shaft 207. A limit or sensing switch housing structure 209 is mounted to a bracket 210, which in turn, is secured to the support beam 200 at a location along the length thereof. The limit switch is employed on the return movement of the mechanism 130 to de-energize the drive motor for shaft 207.

The previously mentioned push rod 138 forms part of the second transport mechanism 130. Said rod 130 is secured to the main bracket 204 by means of a pivotally mounted lever member 212, pivotally connected to said bracket at 213. With reference to FIG. 27, the lever member 212 is relatively long having the push rod 133 attached to one end thereof extending beyond the bracket 204, with a segment thereof also extending beyond said bracket 204 in the opposite direction, as viewed in FIG. 27. Mounted upon this rewardly extending portion of lever member 212 is a cam roller 214 engageable with a cam rail 217, having a spring biased ramp portion 216. The ramp portion 216 is normally maintained in the position illustrated in full line by a spring member 218.

Initially, the roller 214 is positioned proximate the lower end of ramp portion 216, that is below the level of cam rail 217. When in this position, the spring 219 will maintain the pusher rod 138 in the elevated position, as shown in phantom outline. Upon movement of the drive mechanism 206, the roller 214 will engage ramp portion 216 and move upwardly onto cam rail 217 to the position illustrated in FIG. 27. As this occurs, the lever arm 212 will pivot about point 213, lowering the push rod 138 so that the forward end thereof will be disposed within the trough 126 for engaging a counted stack of ends. Once the pusher rod 138 is lowered, it will be maintained in that position by the engagement of cam roller 214 on the cam rail 217. Accordingly, as the drive mechanism 206 advances, the forward end of rod 133 will engage the counted stack of ends in trough 126 and move said stack therealong to the bagging station for disposition in a bag element, as shown in FIG. 28. At the downstream end of the cam rail 217 there is a spring biased door element 220 over which the cam roller travels on its forward movement while pushing can ends into a receiving bag. However, on the return movement of the second transport mechanism the drop door 220 will be biased to an upward, open condition, as shown and the cam roller 214, due to the action spring 219 will follow a downwardly disposed ramp portion 221 to position said roller 214 beneath the level of the cam rail 217. This then raises the push rod 138 out of the trough 126 and precludes interference with can ends being delivered to the trough 126 by the restacking mechanism of station 129. As the mechanism 130 returns to its initial position, the roller 214 will engage the ramp portion 216 biasing it open and permitting said roller to be disposed for engagement on the cam rail 217 pursuant to the next operating cycle.

Can ends transported along the trough 126 are delivered to a horn member 230 which has a plurality of flexible finger portions 230a, substantially completely circumscribing the entire stack of can ends as they pass therethrough. To assist in the maintaining of a longitudinal stack of can ends in an upright position, a plurality of spaced apart diametrically opposed flexible finger members 236 are spaced along the sides of the trough 126. As a stack of ends is advanced along trough 126, the member 236 will engage the foremost ends, and if these have toppled, they will be righted, by said flexible member 236. The member 236 being flexible, they are easily pushed back to allow the stack to pass freely along the trough 126.

Referring now to FIG. 28, there is shown a portion of the machine beyond that illustrated in FIG. 27. In this instance, however, the horn 230 has been advanced into engagement with a bag element 139a, the position of horn 230 with regard to the condition shown in FIG. 27, is illustrated in phantom outline. The horn 230 will maintain the bag 139a open while can ends are disposed therein through said horn, the flexible finger portions 230a moving outwardly to permit the passage of ends therethrough.

The mechanism for effecting movement of horn 230 will now be considered. In this regard, the horn 230 is provided with a depending tab 240 and an associated bracket 241 fastened thereto. The tab 240 extends through an elongated slot 243 formed in the bottom portion of the trough 126. Therefore, the horn is free to move forwardly under the influence of a hydraulic cylinder 232 (FIG. 27) and associated push rod 242.

When an opened bag 139a is lowered from its bag holding magazine into position to receive can ends the topmost free open edge 250 of the bag rests upon a support plate 244 and is firmly held in position by a clamp finger 246. The clamp finger 246 is pivotally actuated by a hydraulic cylinder 247 by means of its associated push rod 248 and a pivotal arm 249. The edge of the bag 139a opposite the edge 250 will remain engaged by the bag handling apparatus to be detailed hereinafter, so that an open bag mouth is presented to the horn 230. Accordingly, as the horn 230 moves from the position illustrated in phantom in FIG. 28 to the full line position, the leading tapered end of said horn is disposed within said bag. The action of the clamp finger 246, prevents the bag from moving axially when engaged by the horn 230, and greatly effects the dependability of the horn inserting operation. In addition, this clamping action will also prevent the bag 139a from slipping off the horn when the counted stack of ends are disposed therein.

To control operation of the horn 230, sensing means 245 in the form of a pair of photo-electronic devices are employed, these being illustrated schematically in dotted outline, FIG. 28. The respective upper and lower devices create a pair of light beams, each at a different level. Accordingly, if the bag misses the plate 244, or is disengaged from the bag handling apparatus, or is otherwise not properly opened, only one of the light beams will be interrupted, and the horn 230 will not be advanced. When the bag is properly opened, both beams are interrupted and a control signal will advance the horn 230.

As can be seen in the drawings the closed finger portions 230a of the horn are urged open as the elongated stack of counted can ends are pushed therethrough. During withdrawal movement of the horn the push rod 138 is preferably held in position for a short period of time until the fingers 230a of the horn are free from engagement with the can ends at the rear of the stack. After this the second transport mechanism 130 and the push rod 138 are retracted to the initial position, preparatory for the next cycle of operation.

Referring now to FIGS. 29-34, details of the bagging station 127, the bag carriage assembly 133, and the filled bag storage unit 134 are shown. To review briefly, the general operation of these stations of the machine, the bagging station 127 is capable of automatically removing a single bag unit and opening it preparatory to insertion of the horn 230. After the bag is filled with a counted stack of ends, it is transferred to the bag carriage unit 133, where the orientation of the bag is changed from substantially horizontal to vertical. The bag storage unit 134 is comprised of a plurality of bags each adapted to house a substantial quantity of filled bags. The drive apparatus for the bag carriage unit 133 is operatively coupled with certain sensing switches in the respective bags, as explained hereinafter, so that the filled bags will be automatically disposed in the empty bags of unit 134.

Attention will initially be directed to the bagging station 127. Here a plurality of longitudinally disposed flattened bags 139 are arranged in a stack in the magazine portion of the bagging station and held in place between a pair of upstanding spaced apart rails or guide members 261 and 262. To support the stack of bags a pair of inwardly turned support edges 261a and 262a are provided and form a spacing therebetween slightly less than the transverse dimension of the bag so that a single bag element can forcefully be withdrawn from the bottom of the stack.

Removal of the bags 139 from the magazine 216 and 262 is effected by means of a plurality of suction cups 263, in the present case three are employed. The forwardmost suction cup 263 may be viewed in FIg. 28, wherein the elongate frame 265 to which the suction cups 263 are mounted is shown. Returning to FIG. 29, it is to be understood that the suction cups 263 are movable from the position illustrated in full line to the position illustrated in dotted outline immediately below the bag magazine 261-262.

Each suction cup 263 is connected to a conduit member 264 which is in turn mounted on the aforementioned elongate frame 265 by suitable bracket means. The respective conduit members 264 each include an outlet post operatively connected to a flexible vacuum hose 264a which lead to a vacuum pump (not shown). Elongate frame 265 is in turn operatively connected to an air cylinder unit 267 by means of a bracket assembly 266 carried on the operating rod 268 of said air cylinder unit. Accordingly, as the air cylinder unit is actuated to withdraw the operating rod the frame 265 and the associated suction cups 263 will be raised to the position shown in dotted outline.

Disposed immediately below the bag magazine 261-262, is a bag receiving support tray 269 upon which the bag 139 will rest before, during and immediately after filling. The support tray 269 is provided with suitable voids or openings, as shown in FIG. 30, to permit the suction cups 263 to move from beneath the plate to the position shown in dotted outline in FIG. 29.

During operation, the control apparatus for the machine 125 (not shown) will include certain timing means for automatically energizing the air cylinder 267 to raise the suction cup elements 263 into engagement with the bottommost bag of the stack. Due to the suction force being created by the withdrawal of air from the conduit 264, the bag will be firmly gripped by the suction cups 263. Accordingly, as the suction cups 263 move downwardly to their lowermost position, the gripped bag will be removed from the magazine and carried with said suction cups 263.

The further operation of the bagging station 127 will now be detailed with reference to both FIGS. 28 and 29. In this regard, it should be kept in mind that the bags 139 include an open mouth structure, having an upper edge 250 which extends out beyond the lower edge 139b. While this is shown in FIG. 28, a better view of the bag mouth is had with reference to FIGS. 21 and 22. Accordingly, as the suction cups 263 move downwardly, the upper edge 250 of the bag will engage the support plate 244. The forwardmost suction cup 263, maintains its grip on the lower mouth 139b 139b and continues downwardly to its lowermost position. This action forces open the bag mouth, and at a suitable point in the cycle the clamp finger 256 is operated to clamp the upper bag edge 250 into firm engagement with the plate 244. The bag 139 is now resting on the support plate 269 and the bag mouth being properly open, the horn 230 may be advanced and disposed within the bag 139 in preparation for receipt of a stack of can ends.

During upward movement, and the initial stages of downward movement of the elongate frame 265 and suction cups 263, all of said cups 263 are connected to the vacuum source. However once the bag is lowered onto support support plate 269, only the vacuum supply to the forwardmost suction cups 263 is maintained, the supply to the rewardmost suction cups 263 being automatically shut off. Supply to the forward cup 263 and the resulting gripping engagement is employed to assist in maintaining the bag mouth open during insertion of the horn 230. However, it was found that if the vacuum supply to the rearward suction cups is not terminated prior to filling, the bag element 139 will not expand properly on a regular bases, and when this occurs, movement of the stacked ends will engage the collapsed bag and force it off the horn 230.

Figure 34:
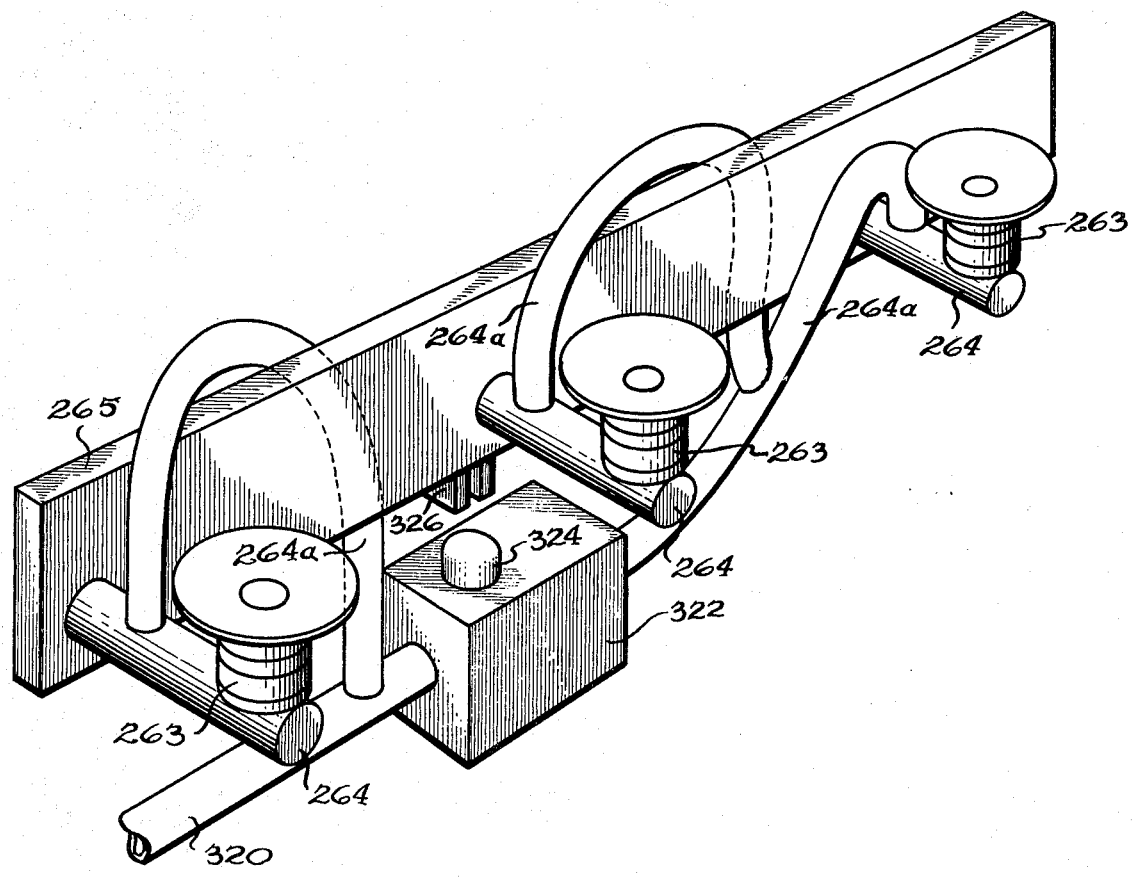
FIG. 34 is a perspective partial schematic view of the vacuum supply means for the bag removal means.

The apparatus for controlling the vacuum supply to suction cups 263 is illustrated in FIG. 34. More specifically, a main vacuum line 320 is provided which is connected to a valve member 322. The main vacuum line 320 is connected directly to the forwardmost suction cup 263 prior to its connection with valve 322, it being seen that communication between the main line 320 and the vacuum supply lines 264a for the rewardly disposed suction cups is controlled by valve 322. The valve 322 includes an operating plunger 324 which controls the internal elements of valve 322, and which, when in the elevated position, permits communication to be established between the main vacuum line 320 the rearwardly disposed suction cups. The elongate frame 265 includes an actuator element 326 disposed to engage and depress the plunger 324. Accordingly, when the frame 265 is elevated, all of the suction cups 263 will be operational, however, when the frame is lowered, as discussed previously, the actuator 265 will operate the valve 322 to render the reward suction cups 263 non-operational.

When the bag 139 is filled, and the horn 230 and second transport means 130 retracted, the bag support tray is pivoted upwardly, as shown in dotted outline in FIG. 29, to deliver the filled bag to the carriage assembly 133. In conjunction with this operation the bag closing mechanism 140 is operated to fold a portion of the open bag mouth inwardly thereby preventing the ends from falling out.

The bag closing mechanism will be discussed only briefly, and is best viewed in FIG. 31. In this regard, there is provided an air cylinder 140, which has a reciprocal operating arm 140b. Attached to arm 140b is a blade element 140c. The entire unit 140 is disposed adjacent the forward edge of support tray 269. Accordingly, after retraction of the horn 230, and before pivoting of tray 269, the unit 140 is operated to move blade 140c forward to engage the open mouth of a bag element 139. This engagement folds a portion of the bag mouth inwardly in overlapping relation to the can ends. Thus, during transfer of the filled bag to the carriage unit 133, there is no danger that any said can ends will fall out of the bag.

Considering now the operation of the support tray 269, attention is focused on FIG. 29 again, wherein the movement of said tray is illustrated in dotted outline. The support tray 269 is carried on a bell crank 270, pivotal about a central support axis 271. An extended portion of the bell crank 270 is connected to an air cylinder 272 through its actuating rod 273. When the cylinder 272 is actuated, the tray 269 pivots, as illustrated and, the filled bag 139a is dumped or transferred automatically from said tray 269 to a filled bag receiving tray or trough member 274 which forms part of the positioning carriage mechanism 133. To assist in guiding the filled bag 139a from the bag supporting tray 269 to the filled bag receiving trough member 274 an inclined surface 276 is interposed between these two operating positions. The inclined surface 276 may be part of the machine proper.

As was discussed previously, the purpose of the carriage assembly 133 is to receive a filled bag from the bagging station and dispose said bag in the bays of the bag storage unit 134. Toward this end, and with reference to FIGS. 20 and 22, it must be kept in mind that the trough member 274 is first pivoted to a generally vertical position, and then the carriage assembly is operated to move said trough member 274 laterally of the bagging station 125 into alignment with one of the bays of the bag storage unit 134. Once alignment is accomplished, the tray is then moved laterally of the path of travel of the carriage assembly 133 in order to dispose the filled bags within said storage bays. Once this is done, the apparatus must then move in reverse sequence back to its initial position preparatory for the next cycle of operation. This operation is attained by the control circuit for the assembly 133 which is illustrated schematically in FIG. 30.

With the above sequence of operation in mind, the details of the carriage assembly 133 will now be considered, The carriage assembly 133 is seen more clearly in FIGS. 30 and 31 and includes an upper unit 280 which includes four upstanding post members 281 mounted to a base plate 282. At the upper end of the post members 281 is an upper support plate 283 which has mounted thereon a bracket 284. Pivotally connected to the bracket 284 is the filled bag receiving trough member 274, a pivot point being provided by a bearing shaft 286. The filled bag receiving trough member 274 has a depending flange 287 pivotally engaged with the shaft 286, with a lower end portion thereof operatively concted to the movable actuator of an air cylinder unit 8. Accordingly, when the filled bag is delivered to e trough member 274, the cylinder unit 288 is actuzd to cause said trough member to pivot about the is 286. Thus, the orientation of said trough member '4 will be changed to that as shown by the broken ies of FIG. 30.

Preferably, the carriage assembly 133 will include a nsing device to sence the presence of a bag in the ough member 274, which sensing device controls the tuation of cylinder unit 288. In the illustrated em- )diment, a switch unit 296 is employed, which includes an operating arm 292a that extends through an )ening in the trough member and will be engaged ien a bag is disposed therein. The switch 296 is operively connected with the control circuit to produce e desired sequence of operation.

The entire upper frame unit 280, comprised of upper id lower plate members 292 and 293 and post mem:rs 281 and the trough member 274 and its mounting id actuating means, are all carried by lower, movable pport plate 290. The lower support plate 290 is movıly mounted on a stationary base structure 291. The ationary base structure 291 includes an overall frame onstruction, including standards 291a and horizontal ame element 291b. Carried atop the horizontal frame ement 291b, are a pair of parallel guide rails 299, )on which is mounted the lower movable support ate 290.

With reference to FIG. 31, the drive mechanism for e lower support plate 290 will now be considered. In is regard, a rotatable shaft 300 is journaled to the se structure 291 and is driven by a motor 300a rough suitable gearing 301. Mounted on the rotatable aft 300 is a Rohlix type drive unit 302 of similar conruction to those described previously. The Rohlix pe drive unit 302 is in turn, mounted to the underside the lower support plate 290. Accordingly, rotation shaft 300 will produce movement of drive unit 302 similar construction to those described previously. he Rohlix type drive unit 302 is in turn mounted to ie underside of the lower support plate 290. Accordgly, rotation of shaft 300 will produce movement of ive unit 302 along the length thereof. Correspondgly, the support plate 290 to which said drive unit 302 connected will also move along the parallel guide ils 299. Further, since the frame unit 280 is carried y the support plate 290, said entire frame unit and its ssociated structure will also move along the length of ie base structure 291, as depicted in FIG. 31.

The above-mentioned movement of the frame unit 30 and the trough member 274 containing a filled bag, ill continue until the trough member is aligned with bay of the storage unit 134, capable of accepting a lled bag. Once alignment is attained the entire frame nit 280, including trough member 274 is moved laterly of the base structure 291 to dispose a filled bag ierein. The structure for effecting said lateral movent and said alignment, as well as the details of the ag storage unit 134 are set forth hereinafter.

Considering first the apparatus for effecting lateral ovement of the frame unit 230 and trough member 74, attention is initially directed to FIG. 20. In this reard, the lower plate member 282 of frame unit 280 is iounted above the movable, lower support plat 290 by ieans of a pair of slide support members 290a. Furier, the lower plate member 282 has an air cylinder unit 292 fixedly mounted thereon, with the operating rod 293 of said unit fixedly connected to bracket element 294 which is carried by the lower support plate 290. As viewed in FIG. 30, the operating rod 293 is in its extended condition. Therefore, when air cylinder unit 292 is actuated to retract said operating rod 293, the lower plate member to which said unit 292 is attached will move to the right, as viewed, toward the bag storage unit 134.

As the lower plate member 282 forms part of frame unit 280 to which the trough member 274 is mounted, the aforementioned movement of plate 282 is accompanied by coreesponding movement to the right of the frame unit 280 and trough member 274, as indicated by arrow 295. The degree of lateral travel attained is sufficient to move the trough member 274 from the position illustrated in dotted outline to a position (not shown) wherein said member 274 is disposed within one of the bays of the bag storage unit 134. Upon retractive movement of the trough member 274, the filled bag will be disposed within said bay, and the operating cycle of the carriage mechanism 133 is completed. The control circuit for the carriage mechanism 133, will now index the entire unit 133 back to a position adjacent the bagging station 127, ready for the accepting of the next filled bag. The manner in which the filled bags are disposed in the storage unit 134 and its general construction will now be considered. The details of the filled bag storage unit 134 are best illustrated in FIGS. 32 and 33 which show the side and top views of said unit, which is preferably constructed of elongated members such as metal strips or channels bolted or welded together to form an integral structure. The storage unit 134 comprises a frame 310 arranged to form a plurality of bays or channels 311, 312, 313, and 314 into which filled bags of can ends may be inserted. At the opening of each of the bays there is provided a number of stop finger assemblies 316 secured to support members 317. In this regard, the illustrated embodiment includes three assemblies per bay, i.e., a top, middle and bottom set. As mentioned above, the filled bag tilted in a substantially vertical position, as shown in FIG. 30, is inserted into the entrance opening of the bay lateral movement of the trough member 274. Upon retraction of the trough member 274 the stop finger assemblies 216 will engage the bag and restrain its withdrawal from the bay. As can be seen from FIG. 32, the bays 311–314 are disposed on an incline. Therefore, as additional bags are inserted they will displace the prior bags rewardly, however due to said inclination the bags will remain as close as possible to the entrance end of the bay.

A sensing switch 318 having an actuator arm 319 is provided at the rear of each bay, which is employed to effect the aforementioned alignment of a loaded trough member of the carriage assembly 133. Accordingly, as an individual bag is filled, upon receipt of the last filled bag, the switch 218 will be actuated. The purpose for this structure will become apparent from the following discussion.

Consideration will now be directed to the control means employed in conjunction with the carriage assembly 133 to attain proper alignment with the respective bays 311–314. For this purpose, attention is again directed to FIG. 31, wherein it can be seen that a plurality of sensing or switch units 303 are carried by the base structure 291, and disposed beneath the path of movement of the support plate 290. The position and spacing between said units corresponds to that of the bays 311–314. The plate 290 or some other element of the frame unit 280 will include actuating means for engaging the switches 303 in sequences responsive to movement of said frame unit, such that one of said switches 303 will be engaged as a function of an instance of alignment of the trough member 274 with one of said bays 311–314.

As will now be exmplained, the swtiches 318 and 303 are operatively connected with the overall control circuit, and most particularly with the drive motor 300a for the frame unit 280. The end result of this interaction is that there is provided a sensing circuit which will detect which of the bays is capable of receiving a bag, with the frame unit 280 stopping at the first available bay and disposing a filled bag therein. In this regard, switches 303 may be normally closed, while switches 318 may be normally open. Thus as the frame unit 280 travels along the guides 291b the swithces 303 are sequentially opened. Assuming that only the first bay 311 is filled with bags, its associated switch 318 will close. Upon an instance of alignment of trough member 274 with bay 311, switch 303 will be open and the associated switch 318 closed. Therefore, one of said switches being closed, the supply of pwwer to drive motor 300a is not interrupted and the frame unit will move onward. When alignement with bay 312 is attained, its associated switch 303 will be opened, but since this bay is not filled, the coresponding switch 318 will also be open. As such when open, switches 303 and 318 for a given bay are encountered, the supply of power to the drive motor 300a will be interrupted for a sufficient time to stop the frame 230 in proper alignment, and permit disposition of a filled bag within said bay. After a specified time period, built into the operational sequence by the control circuit, power is again supplied to motor 300a to return the frame unit 280 back to its original position in preparation for the next sequence of operation.

The control circuitry for machines 10 and 125 is important only insofar as same can obtain the desired mode of operation, as discussed above. Since those skilled in the art could devise numerous control systems for attaining the desired mode of operation of the machines 10 and 125, only such detail as is necessary to a full understanding of the invention has been included.

Further, while several distinct embodiments of the invention have been illustrated and discribed, it is to be understood that those skilled in the art could effect numerous variations, modifications, and substitutions without departing from the spirit and scope of the invention, which are defined by the claims appended hereto.

The invention is claimed as follows:

1. Can end handling apparatus capable of receiving a continuous flow of can ends and automatically counting and separating a stack of ends of a prescribed number posed in facewise, stacked relation for delivery to a packing station, or the like, said apparatus comprising: a receiving station including elongate trough means for handling a plurality of can ends in stacked, facewise engagement; means for advancing said can ends longitudinally of the trough means; monitoring means responsive to said can ends for counting the number of can ends passing a predesignated location, said monitoring means comprising a pair of opposed rollers having a plurality of longitudinal grooves formed therein, each of said grooves being sized to receive but a single can end edge, said rollers being disposed on opposite sides of said trough means at said preselected location to engage the stacked can ends, whereby upon said engagement of the ends by said rollers the ends will become separated from the adjacent ends of the stack with movement of said ends along said trough being retarded, restacking means disposed axially of said opposed rollers along said trough and receiving said separated can ends from said rollers, such that said rollers and said restacking means cooperating to define a gap in the stream of can ends passing along said trough, with said can ends passing one at a time through said gap, and counting means monitoring the passage of can ends passing said preselected location and providing a control signal upon the passage of a prescribed number of can ends; and separator means operatively connected with said monitoring means and capable of isolating a counted stack of can ends from the continuous stream of can ends, such that the downstream portions of the stack of can ends are disposed longitudinally of said separator means and the engaged counted stack, said separator means receiving said control signal from said monitoring means, which signal effects operation thereof.

2. Apparatus as defined in claim 1, wherein said separator means includes a pivotally mounted member movable into the flow of can ends, carriage means supporting said pivotally mounted member and movable parallel to said trough whereby upon positioning of said pivotally mounted member in said stack of can ends, and upon operation of said carriage means, said counted stack of can ends will be moved along said trough away from said continuous stream of can ends 3. Apparatus as defined in claim 1 wherein said elongate trough means includes an operating station remote from said receiving station, said apparatus further including transport means for transferring said counted stack of can ends along said trough means to said operating station.

4. Apparatus as defined in claim 1, wherein said receiving station includes positioning means for receiving can ends in edge-wise, unstacked relation and placing said ends in stacked facewise alignment on said trough means.

5. Apparatus as defined in claim 4, wherein said positioningg means includes a chamber having an opening sized to admit can ends in facewise relation, air evacuating means operably connected with said chamber for drawing air into said chamber through said opening, and means for presenting can ends to said chamber in coaxial alignment with said opening, whereby said ends are pulled into said chamber through said opening and engaged in facewise stacked relation on said trough means.

6. Apparatus as defined in claim 1, wherein said drive means includes a plurality of counter-rotating drive members drivably engaging the can ends in stacked relation to force said ends longitudinally along said trough means.

7. Apparatus as defined in claim 1, wherein said counting means comprises a rotatably mounted disc having a plurality of circumferentially disposed apertures formed therein, and corresponding in number to the grooves on said opposed rollers, means operatively connecting said disc to one of said opposed, grooved rollers for rotation therewith, electric eye means associated with said disc and adapted to establish a light beam through said circumferentially disposed apertures such that upon rotation of said disc said beam will be alternately disrupted and re-established, with said instances of disruptment and re-establishment indicating the passage of can ends through said gap.

8. Apparatus as defined in claim 7, wherein said counting means further includes means receiving said pulses and producing said control signal upon receipt of a prescribed number of said pulses.

9. Apparatus as defined in claim 1, wherein said restacking means is pneumatic and comprises a chamber disposed about said trough means and defining therewith an entrance opening means and an exit opening, air evacuating means operably connected with said chamber for drawing air into said chamber through said entrance opening, such that as can ends are separated from the stack and leave said groove rollers, said ends will be pulled through said gap and drawn into said chamber and re-engaged in stacked face-wise relation; and drive means disposed within said chamber for engaging said restacked can ends and moving same longitudinally along said trough means.

* * * * *